United States Patent
Nakamura et al.

(10) Patent No.: US 7,604,889 B2
(45) Date of Patent: Oct. 20, 2009

(54) LIQUID FUEL CELL SYSTEM

(75) Inventors: Akio Nakamura, Shinagawa (JP);
Junichi Akama, Shinagawa (JP); Yuriko Segawa, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 947 days.

(21) Appl. No.: 10/960,024

(22) Filed: Oct. 8, 2004

(65) Prior Publication Data
US 2005/0170230 A1    Aug. 4, 2005

(30) Foreign Application Priority Data
Feb. 3, 2004    (JP) ............................. 2004-026463

(51) Int. Cl.
*H01M 2/00*    (2006.01)
(52) U.S. Cl. ...................................... 429/34
(58) Field of Classification Search .............. 429/12–46
See application file for complete search history.

(56) References Cited

U.S. PATENT DOCUMENTS

| | | | |
|---|---|---|---|
| 6,341,524 B1 * | 1/2002 | Nagase et al. ................. 73/317 |
| 2003/0129464 A1 * | 7/2003 | Becerra et al. ................ 429/25 |
| 2004/0013927 A1 * | 1/2004 | Lawrence et al. ............. 429/34 |

\* cited by examiner

*Primary Examiner*—Patrick Ryan
*Assistant Examiner*—Muhammad Siddiquee
(74) *Attorney, Agent, or Firm*—Staas & Halsey LLP

(57) ABSTRACT

A liquid fuel cell system is disclosed. The liquid fuel cell system includes a liquid fuel cell unit and a liquid fuel cartridge that can be connected to the liquid fuel cell unit. The liquid fuel cell unit and the liquid fuel cartridge each include a valve unit. The liquid fuel cartridge is connected to the liquid fuel cell unit so as to pour and supply liquid fuel that is a methanol solution from the liquid fuel cartridge to the liquid fuel cell unit. Using the supplied liquid fuel, the liquid fuel cell unit generates power to charge a battery. After the charging, both of the valve units are opened to return the liquid fuel remaining in the liquid fuel cell unit back to the liquid fuel cartridge, and thus, the liquid fuel cell unit is emptied.

11 Claims, 33 Drawing Sheets

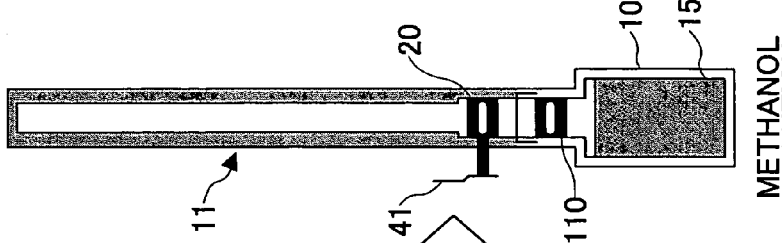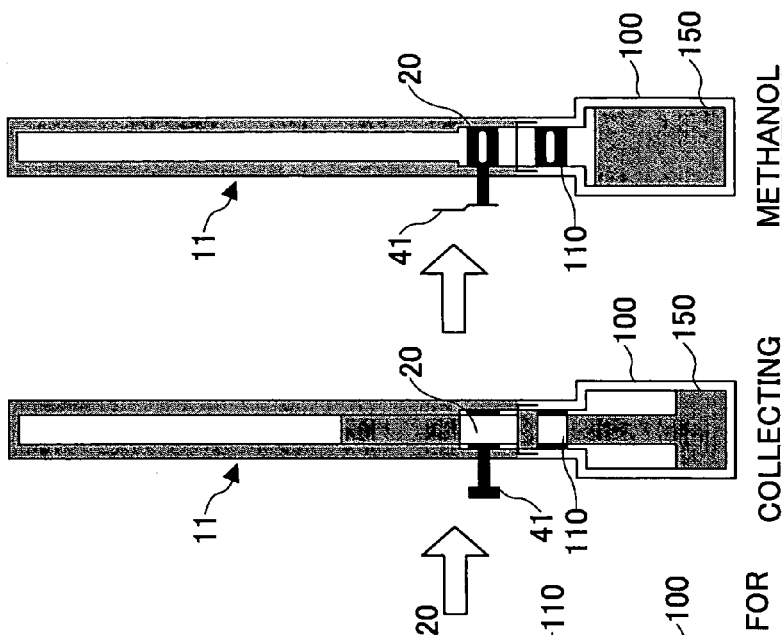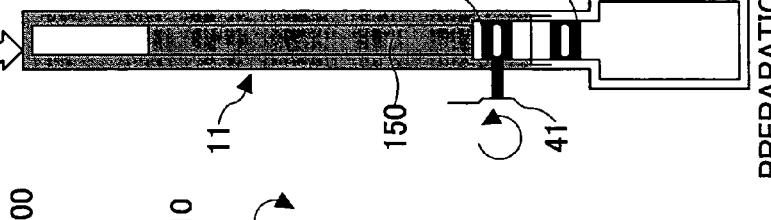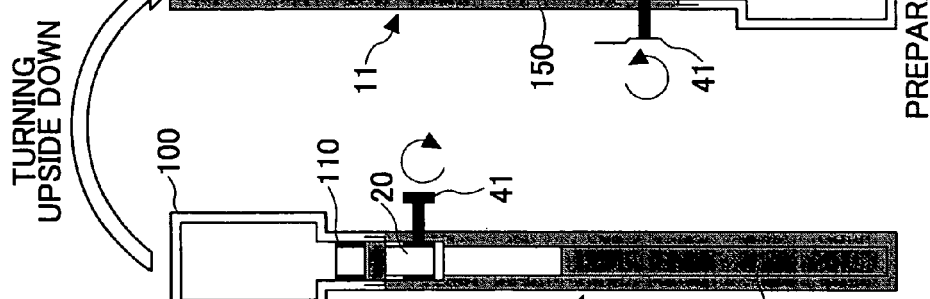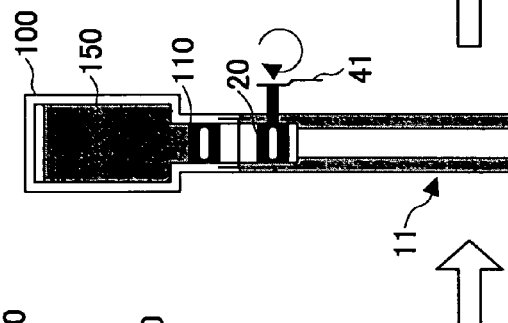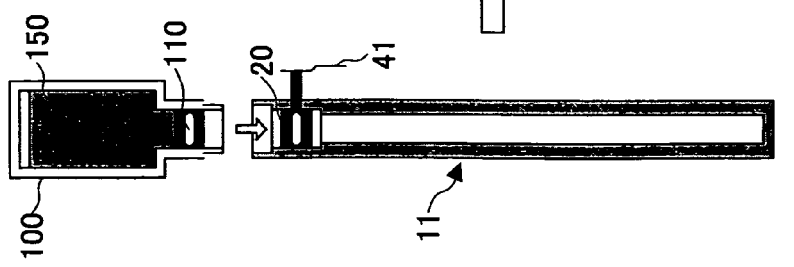

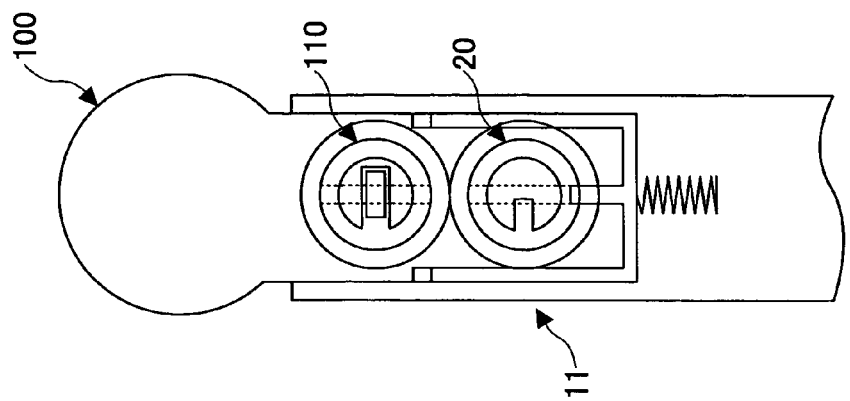
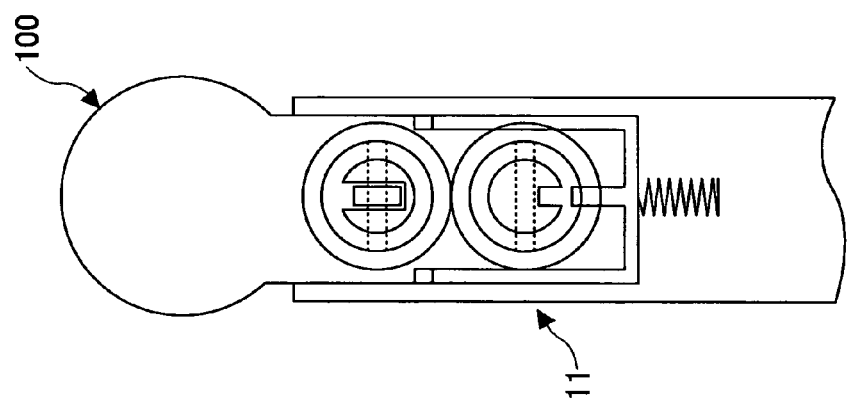
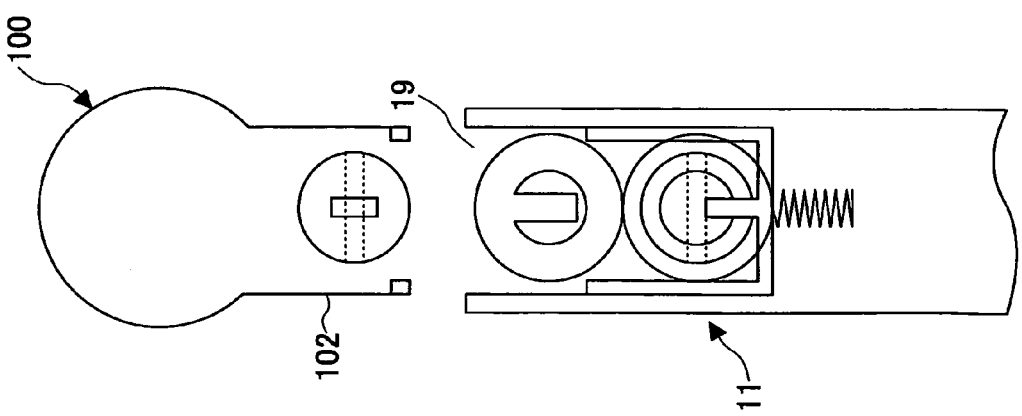

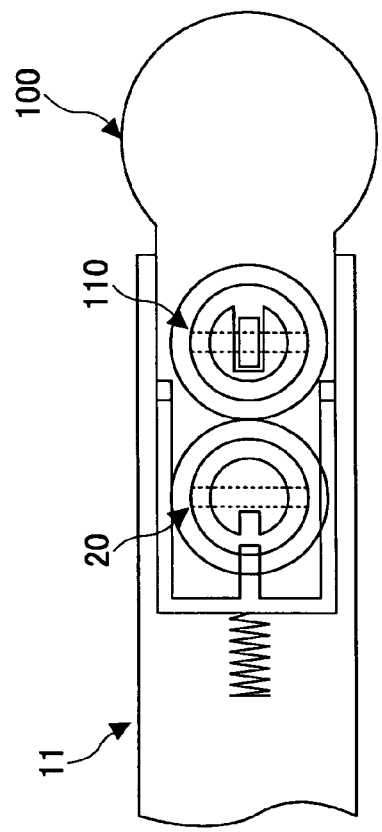
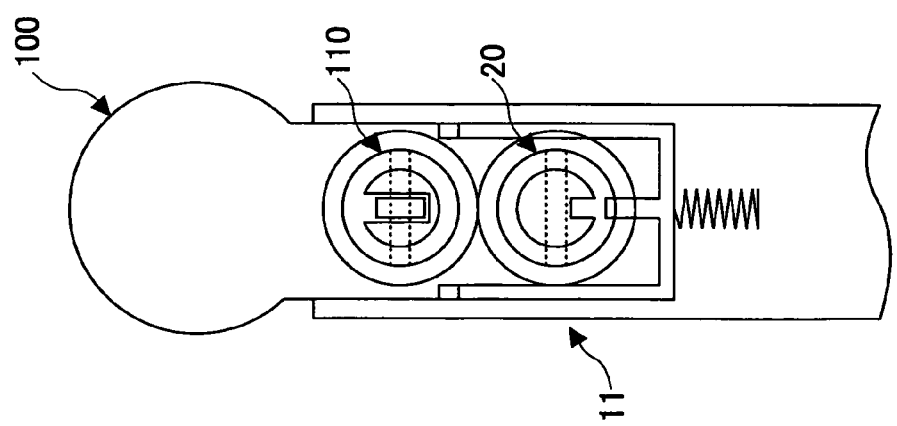

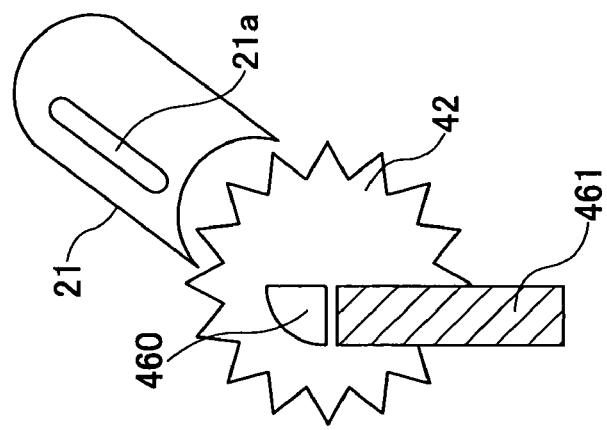
FIG.31A  0°
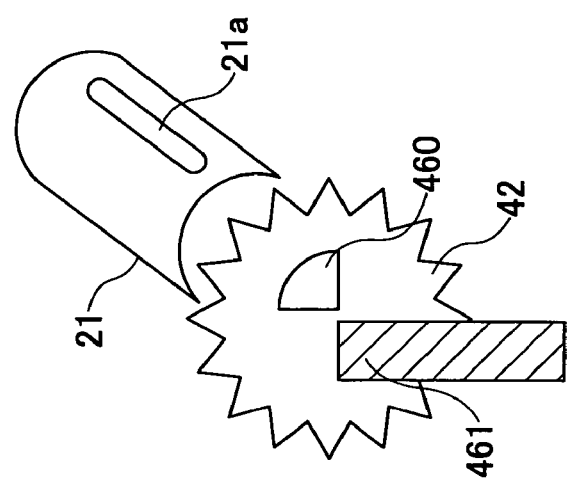
FIG.31B  90°
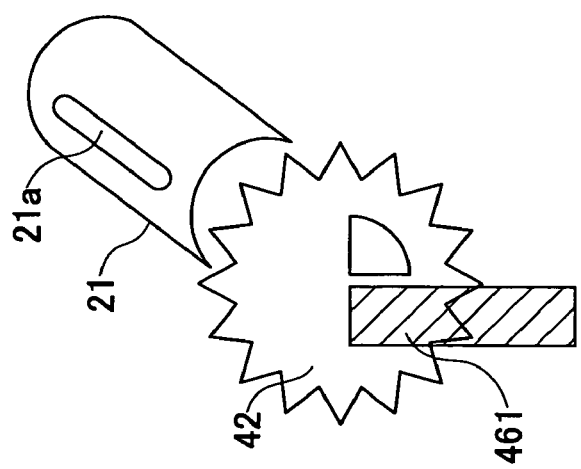
FIG.31C  180°

LIQUID FUEL CELL SYSTEM

BACKGROUND OF THE INVENTION

The present invention generally relates to liquid fuel cell systems, and, more particularly, to a liquid fuel cell system that has a structure in which a liquid fuel cartridge is connected to a liquid fuel cell unit so as to pour and supply liquid fuel that is a methanol solution into the liquid fuel cell unit. This easy-to-use liquid fuel cell system can be used as a power source for charging the battery of a portable electronic device or a power source of a portable electronic device.

A liquid fuel cell system that can be used as a power source for charging the battery of a portable electronic device or a power source of a portable electronic device may have a structure in which a suitable amount of liquid fuel for power consumption is supplied through a pump, or a simple structure in which a liquid fuel cartridge is attached to a liquid fuel cell unit so as to pour and supply liquid fuel into the liquid fuel cell unit. A liquid fuel cell system of the former structure is too large to be used as a power source of a portable electronic device. A liquid fuel cell system of the latter structure is small enough to be used as a power source of a portable electronic device.

In the conventional simple-type liquid fuel cell system, a liquid fuel cartridge is simply connected to a liquid fuel cell unit so as to pour and supply liquid fuel into the liquid fuel cell unit.

The above conventional simple-type liquid fuel cell system is used to supply a predetermined amount of liquid fuel from the liquid fuel cartridge to the liquid fuel cell unit, with the battery charging time and the usage time of the portable electronic device being taken into consideration. In a case where the battery charging and the use of the portable electronic device end earlier than expected, however, some liquid fuel remains in the liquid fuel cell unit even though electric power is not being consumed any more.

If this situation continues for a long time, the solid polymer films that form the cells might deteriorate due to the continuous contact with the liquid fuel. As the solid polymer films deteriorate, the service life of the liquid fuel cell is shortened.

SUMMARY OF THE INVENTION

A general object of the present invention is to provide liquid fuel cell systems in which the above disadvantages are eliminated.

A more specific object of the present invention is to provide a liquid fuel cell system that can prevent the solid polymer films from deteriorating and shortening the life of the liquid fuel cell.

The above objects of the present invention are achieved by a liquid fuel cell system that includes a liquid fuel cell unit and a liquid fuel cartridge that is filled with liquid fuel and can be attached to the liquid fuel cell unit to supply the liquid fuel to the liquid fuel cell unit. In this liquid fuel cell system, the liquid fuel remaining in the liquid fuel cell unit is returned to the liquid fuel cartridge through a communications path between the liquid fuel cartridge and the liquid fuel cell unit.

In accordance with the present invention, the unused liquid fuel remaining in the liquid fuel cell unit is returned to the liquid fuel cartridge, so that the liquid fuel cell unit is emptied when a portable electronic device is not consuming electric power. Thus, deterioration of the solid polymer films can be prevented.

The above and other objects and features of the present invention will become more apparent from the following description taken in conjunction with the accompanying drawings.

BRIEF DESCRIPTION OF THE DRAWINGS

FIGS. 9A through 9F schematically illustrate the state of the liquid fuel cell system in use and the movement of the methanol solution;

FIGS. 10A through 10C illustrate the attachment of the liquid fuel cartridge to the liquid fuel cell unit, and the state of each of the valve units;

FIGS. 11A and 11B illustrate the state of the liquid fuel cell system at the time of generating power;

FIGS. 31A through 31C illustrate a mechanism for restricting rotation of a valve;

DESCRIPTION OF THE PREFERRED EMBODIMENTS

The following is a description of embodiments of the present invention, with reference to the accompanying drawings.

Figure 1:
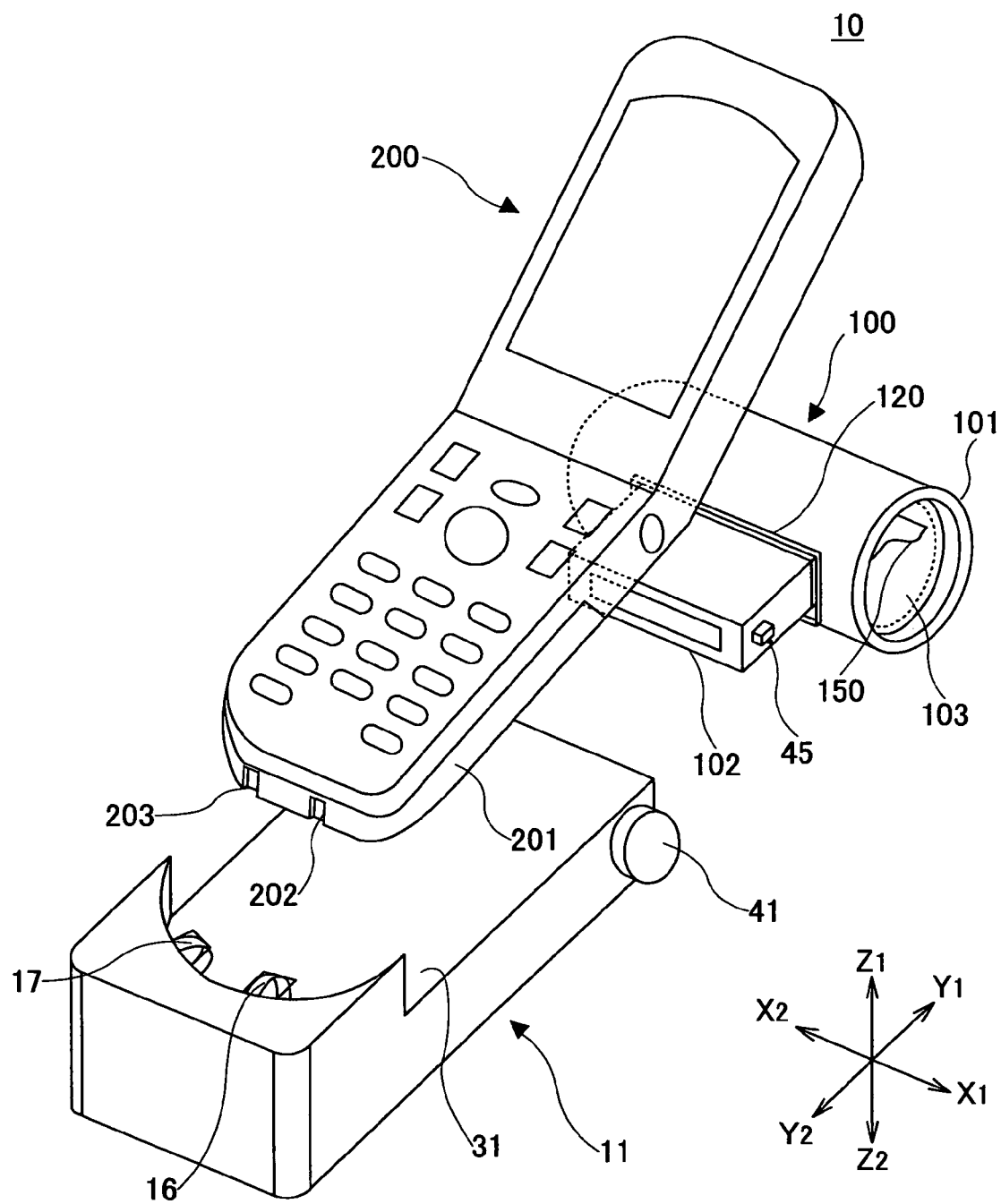
FIG. 1 is an exploded perspective view of a liquid fuel cell system in accordance with a first embodiment of the present invention.
Figure 2:
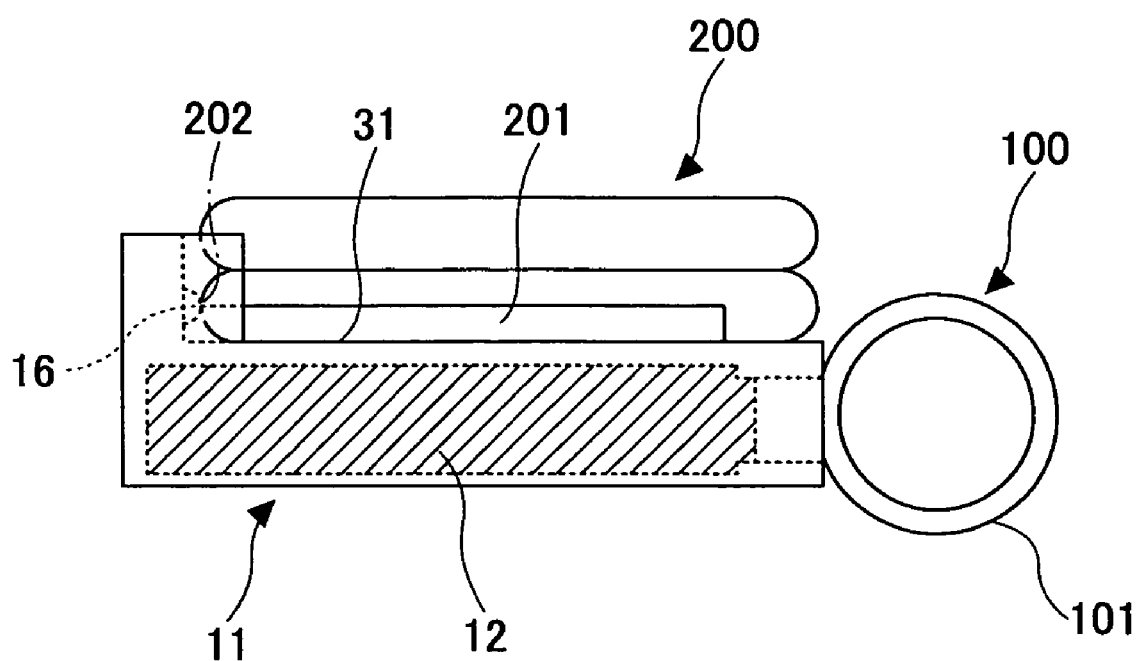
FIG. 2 illustrates the usage situation of the liquid fuel cell system of FIG. 1.

FIGS. 1 and 2 illustrate a liquid fuel cell system 10 of a first embodiment of the present invention. In FIG. 1, Y1-Y2 represents the longitudinal direction, X1-X2 represents the width direction, and Z1-Z2 represents the height direction.

The liquid fuel cell system 10 includes a liquid fuel cell unit 11 and a liquid fuel cartridge 100 that is detachably connected to the liquid fuel cell unit 11. As the liquid fuel cartridge 100 is connected to the liquid fuel cell unit 11, the liquid fuel (methanol) contained in the liquid fuel cartridge 100 is poured into the liquid fuel cell unit 11. Using the supplied liquid fuel, the liquid fuel cell unit 11 generates power. When a charging operation is completed and power generation is not needed any more, the remaining liquid fuel in the liquid fuel cell unit 11 is returned to the liquid fuel cartridge 100, so that the inside of the liquid fuel cell unit 11 can be emptied. This liquid fuel cell system 10 is used, with the liquid cell cartridge 100 being connected to the liquid fuel cell unit 11 as shown in FIG. 2. The liquid fuel cell system 10 is used to charge a battery 201 of a portable telephone 200 in use when the battery 201 is running out of power. Being small-sized, the liquid fuel cell system 10 is easy to carry around. The liquid fuel cell unit 11 and the liquid fuel cartridge 100 form a structure on which the portable telephone 200 can be mounted. The liquid fuel cell unit 11 and the liquid fuel cartridge 100 are designed so that the remaining liquid fuel in the liquid fuel cell unit 11 can be easily returned to the liquid fuel cartridge 100. The liquid fuel cell unit 11 and the liquid fuel cartridge 100 are also designed in such a manner that an operations knob 41 cannot be wrongly operated and the liquid fuel cartridge 100 cannot be inadvertently detached.

Next, the liquid fuel cell system 10 is described in greater detail.

Figure 3:
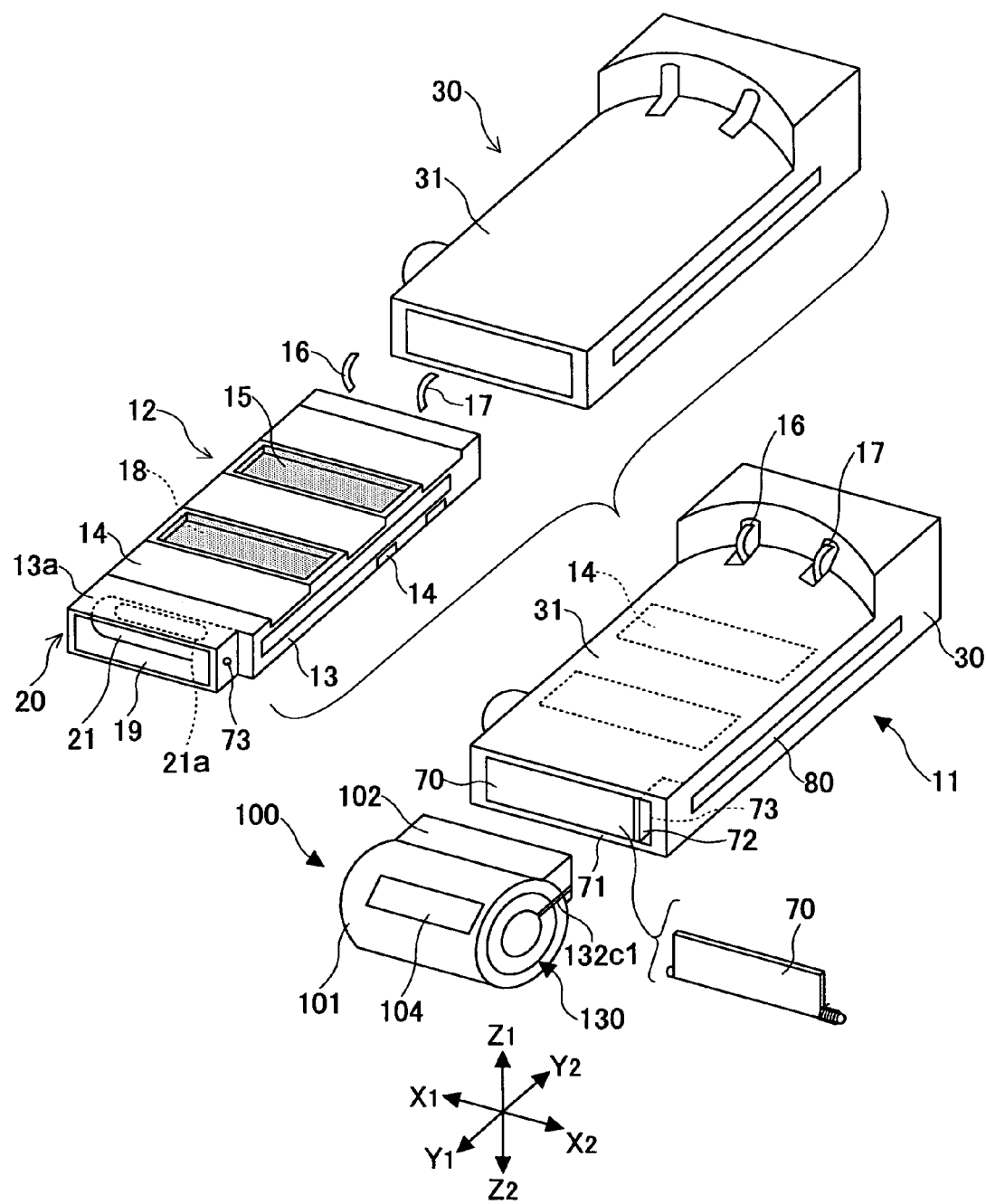
FIG. 3 is an exploded perspective view of the liquid fuel cell system of FIG. 1, seen from a different angle.
Figure 4:
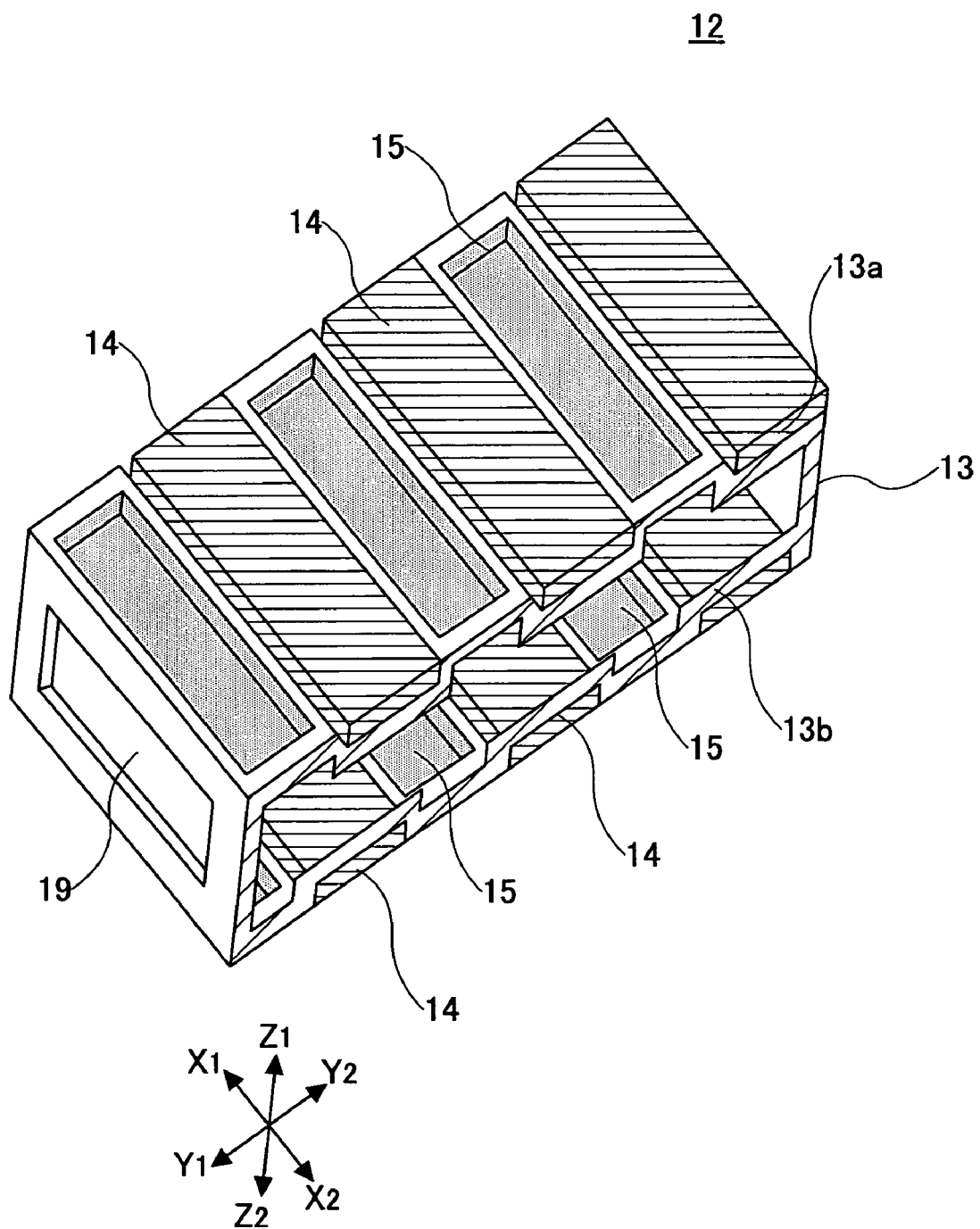
FIG. 4 is a perspective view of part of the power generating unit.

The liquid fuel cell unit 11 is first described. As shown in FIGS. 3 and 4, the liquid fuel cell unit 11 has a power generating device 12 housed in a housing 30.

The power generating device 12 has a main body 13 that is a flat, hollow rectangular parallelepiped. Cells 14 that generate power using a supplied methanol solution and gas permeable films 15 for discharging $CO_2$ are alternately arranged on the upper surface 13a and the lower surface 13b of this main body 13. The cells 14 are electrically connected in series, and the two ends of the series connections of the cells 14 are respectively connected to power supply terminals 16 and 17. The cells 14 and the gas permeable films 15 for discharging $CO_2$ are arranged in the above manner, so that the methanol solution can be supplied to some of the cells 14 to generate power, regardless of the position that the liquid fuel cell system 10 stands in.

The power generating device 12 has a liquid fuel accommodating space 18 therein, and also has an insertion receiving portion 19 at one end that is equipped with a valve unit 20. The valve unit 20 includes a valve 21 and a valve unit housing 13a that is part of the main body 13. The valve 21 is cylindrical and has a slit 21a that penetrates through the valve 21 in the diameter direction. As the valve unit housing 13a is part of the main body 13, the valve unit 20 is small in size. The valve 21 normally blocks the insertion receiving portion 19 deep inside, so that the valve unit 20 is closed. When the valve 21 is rotated through 90 degrees, the slit 21a faces the insertion receiving portion 19, and thus the valve unit 20 is opened.

The housing 30 is a flat, box-like structure, and has a portable telephone mounting portion 31 on its upper surface. The housing 30 covers the power generating device 12, with the power supply terminals 16 and 17 protruding from one end of the portable telephone mounting portion 31.

Figure 5:
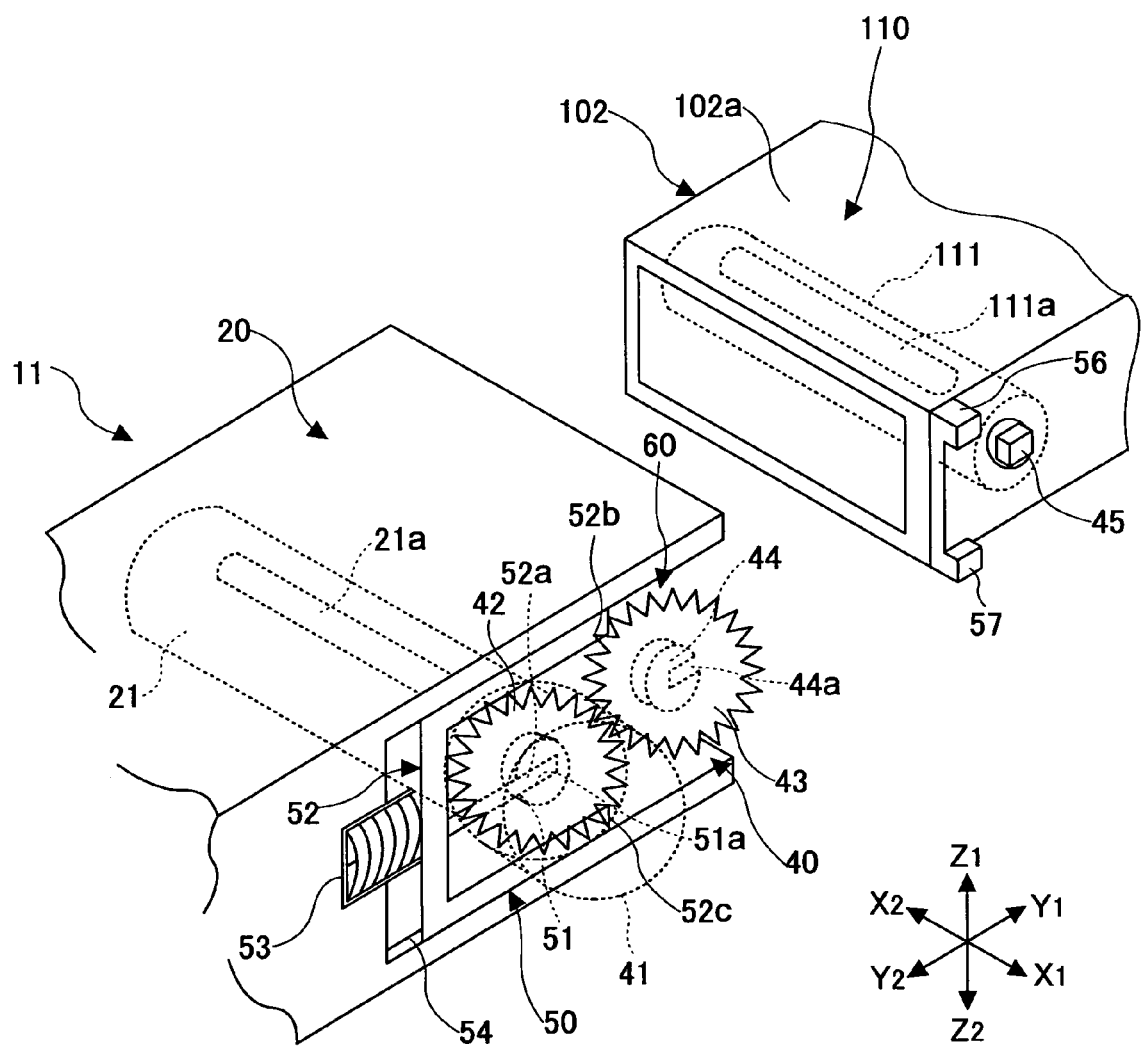
FIG. 5 is a perspective view of the structure in which the insertion receiving portion of the liquid fuel cell unit faces the insertion portion of the liquid fuel cartridge.
Figure 6:
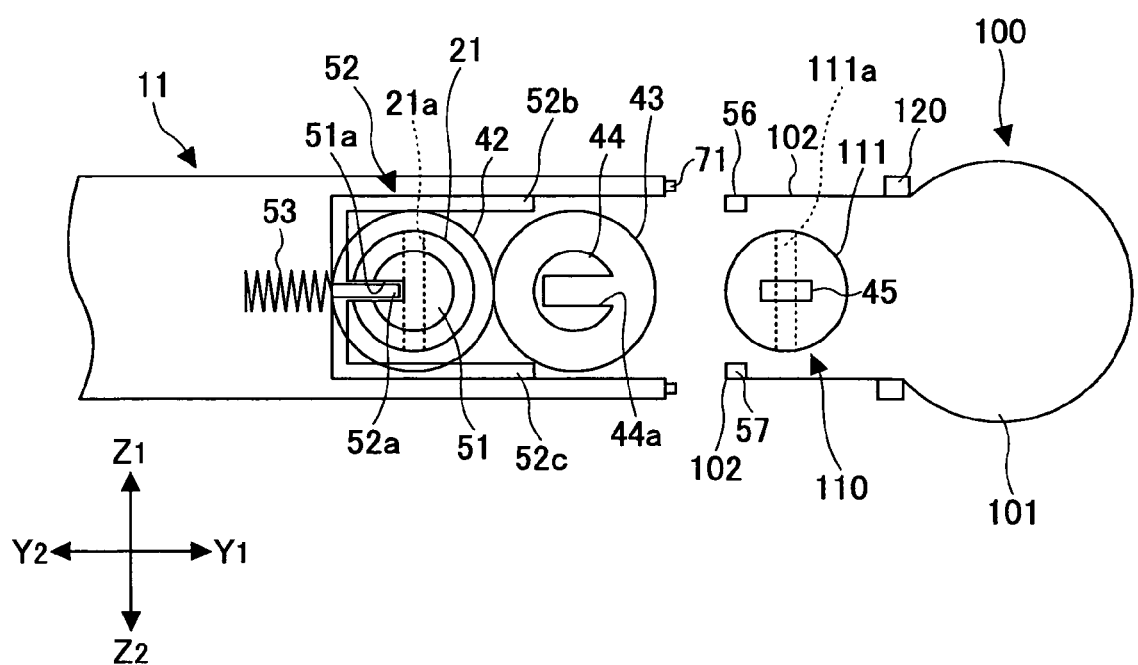
FIG. 6 illustrates the structure in which the insertion receiving portion of the liquid fuel cell unit faces the insertion portion of the liquid fuel cartridge.

As shown in FIGS. 5 and 6, in the vicinity of the insertion receiving portion 19 inside the X1-side surface of the liquid fuel cell unit 11, an interlock mechanism 40, an operations knob lock mechanism 50, and a first liquid fuel cartridge lock mechanism 60 are provided organically in association with one another. The valve unit 20 of the liquid fuel cell unit 11 and the valve unit 110 of the liquid fuel cartridge 100 are interlocked by the interlock mechanism 40. The operations knob lock mechanism 50 prevents a valve opening operation unless the liquid fuel cartridge 100 is attached. The first liquid fuel cartridge lock mechanism 60 prevents the liquid fuel cartridge 100 from coming off the liquid fuel cell unit 11 unless the valve unit 20 of the liquid fuel cell unit 11 and the valve unit 110 of the liquid fuel cartridge 100 are both closed.

Figure 7A:
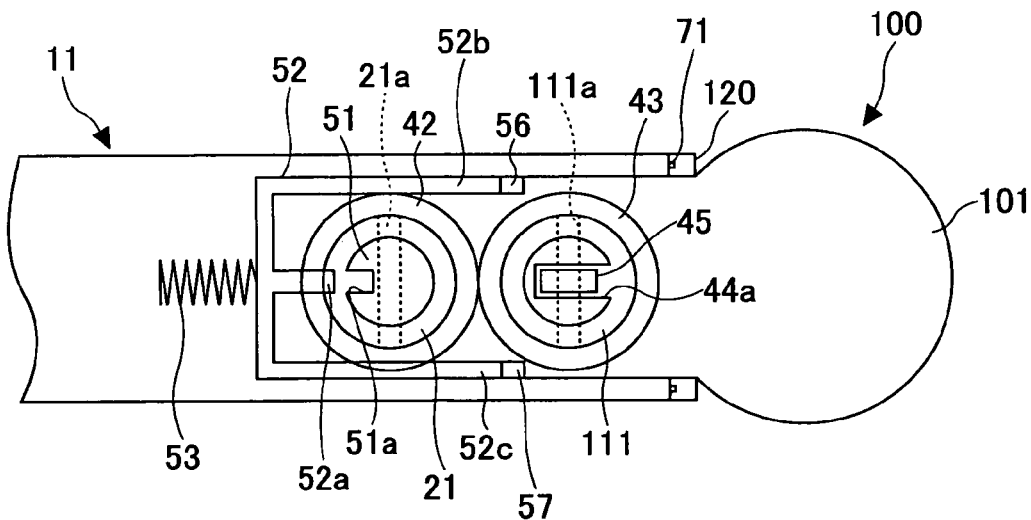
FIGS. 7A and 7B illustrate the structure in which the liquid fuel cartridge is attached to the liquid crystal cell unit.

As shown in FIGS. 5 and 6, the interlock mechanism 40 includes an operations knob 41, a first gear 42, a second gear 43, a cam 44, and a rectangular shaft 45. The first gear 42 and the second gear 43 are engaged with each other. The first gear 42 is provided at one end of the valve 21. The operations knob 41 is fixed to the first gear 42. The second gear 43 is located on the Y1 side of the first gear 42. The cam 44 is integrally formed with the second gear 43, and has a concave portion 44a. When the valve unit 20 is closed, the opening of the concave portion 44a extends in the Y1 direction. The rectangular shaft 45 is provided at the X1 end of the valve 111 of the liquid fuel cartridge 100, and protrudes from the X1-side surface of the liquid fuel cartridge 100. As shown in FIG. 7A, the rectangular shaft 45 is engaged with the concave portion 44a when the liquid fuel cartridge 100 is connected and attached to the liquid fuel cell unit 11.

Figure 7B:
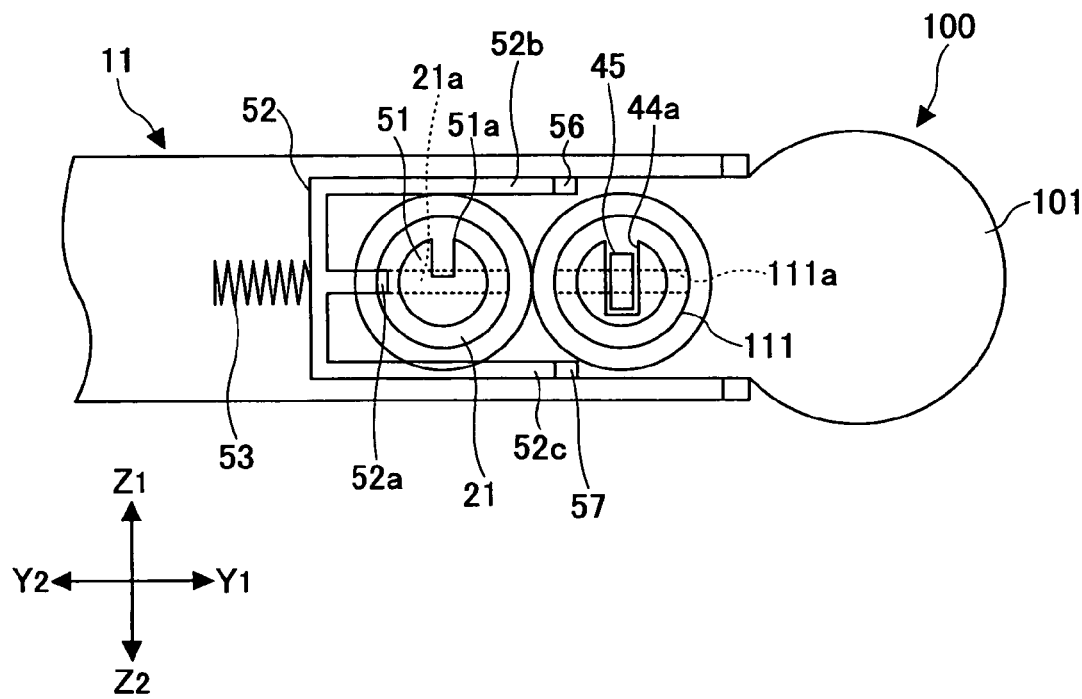

When the operations knob 41 is operated, the valve 21 of the liquid fuel cell unit 11 is rotated, and the valve 111 of the liquid fuel cartridge 100 is rotated through the first gear 42, the second gear 43, and the cam 44, as shown in FIG. 7B. In this manner, the valve 21 and the valve 111 are rotated in synchronization with each other.

Referring back to FIGS. 5 and 6, the operations knob lock mechanism 50 includes a cam 51, a lock member 52, a spring 53, and two protrusions 56 and 57. The cam 51 is integrally formed with the valve 21 and the first gear 42, and has a concave portion 51a. When the valve unit 20 is closed, the opening of the concave portion 51a extends in the Y2 direction. The lock member 52 is E-shaped, and includes a center rod 52a, and upper and lower arms 52b and 52c. The lock member 52 is attached to the inside of a shallow groove 54 formed in a side plate of the main body 13, and can slide in the Y1-Y2 directions. The lock member 52 is normally pushed by the spring 53 in the Y1 direction. When the valve unit 20 is closed, the rod 52a is engaged with the concave portion 51a, and the valve 21 and the first gear 42 are locked so as not to rotate. Accordingly, the operations knob 41 cannot be operated when the liquid fuel cartridge 100 is not attached to the liquid fuel cell unit 11. The top ends of the arms 52b and 52c protrude from the deep inside of a notch portion 55 formed on the Y1 end of the side plate of the main body 13. The two protrusions 56 and 57 are part of the liquid fuel cartridge 100, and protrude from the X1-side surface of the liquid fuel cartridge 100. As shown in FIG. 7A, when the liquid fuel cartridge 100 is connected and attached to the liquid fuel cell unit 11, the protrusions 56 and 57 push the top ends of the arms 52b and 52c, respectively, so that the lock member 52 slides in the Y2 direction. The rod 52a is then disengaged from the concave portion 51a, thereby unlocking the operations knob lock mechanism 50.

The first liquid fuel cartridge lock mechanism 60 includes the concave portion 44a of the cam 44 and the rectangular shaft 45. As shown in FIG. 7B, when the operations knob 41 is operated after the liquid fuel cartridge 100 is attached to the liquid fuel cell unit 11, the concave portion 44a extends in the Z1 direction, and is engaged with the rectangular shaft 45 so as to prevent the liquid fuel cartridge 100 from falling off.

Referring back to FIG. 3, a lid member 70 that is pressed to open is provided on the insertion receiving portion 19 of the liquid fuel cell body 11, so that the insertion receiving portion 19 is covered with the lid member 70. Also, a rib 71 for preventing leakage is formed along the rim of the insertion receiving portion 19.

Also as shown in FIG. 3, a transparent window 80 with a graded scale is formed on the X2-side surface of the liquid fuel cell unit 11. With the transparent window 80, the amount of the liquid fuel in the liquid fuel cell unit 11 can be observed from outside.

Further, a space 72 into which the lock arm 131c1 of a lock mechanism 130 (later described) is to be inserted, and a concave portion 73 with which a hook 131c3 of the lock mechanism 130 is to be engaged, are formed on the X2 side of the insertion receiving portion 19 of the liquid fuel cell body 11.

Next, the liquid fuel cartridge 100 is described.

As shown in FIG. 1, the liquid fuel cartridge 100 includes a cylindrical liquid fuel tank 101 and an insertion portion 102 that protrudes from the liquid fuel tank 101. The liquid fuel tank 101 is filled with a methanol solution 150. Transparent windows 103 and 104 each having a graded scale are formed on the end surface (X1 side) and the circumferential surface, respectively, of the liquid fuel tank 101. The remaining amount of the methanol solution 150 can be observed through the transparent windows 103 and 104.

The insertion portion 102 has such a size as to fit in the insertion receiving portion 19 of the liquid fuel cell unit 11. The valve unit 110 is formed in the insertion portion 102. As shown in FIG. 5, the valve unit 110 includes a valve unit housing 102a that is part of the insertion portion 102, and a valve 111. The valve 111 is cylindrical and has a slit 111a that penetrates through in the diameter direction. As the valve unit housing 102a is part of the insertion portion 102, the valve unit 110 is small in size. Normally, the valve 111 blocks the passage in the insertion portion 102, and the valve unit 110 is closed. When the valve 111 is rotated through 90 degrees, the slit 111a faces the end of the insertion portion 102, and the valve unit 110 is opened. The rectangular shaft 45 is provided on one end of the valve 111. The rectangular shaft 45 and the protrusions 56 and 57 protrude from the X1-side surface of the insertion portion 102. Further, a rubber gasket 120 for preventing leakage is arranged to surround the root of the insertion portion 102.

Figure 8:
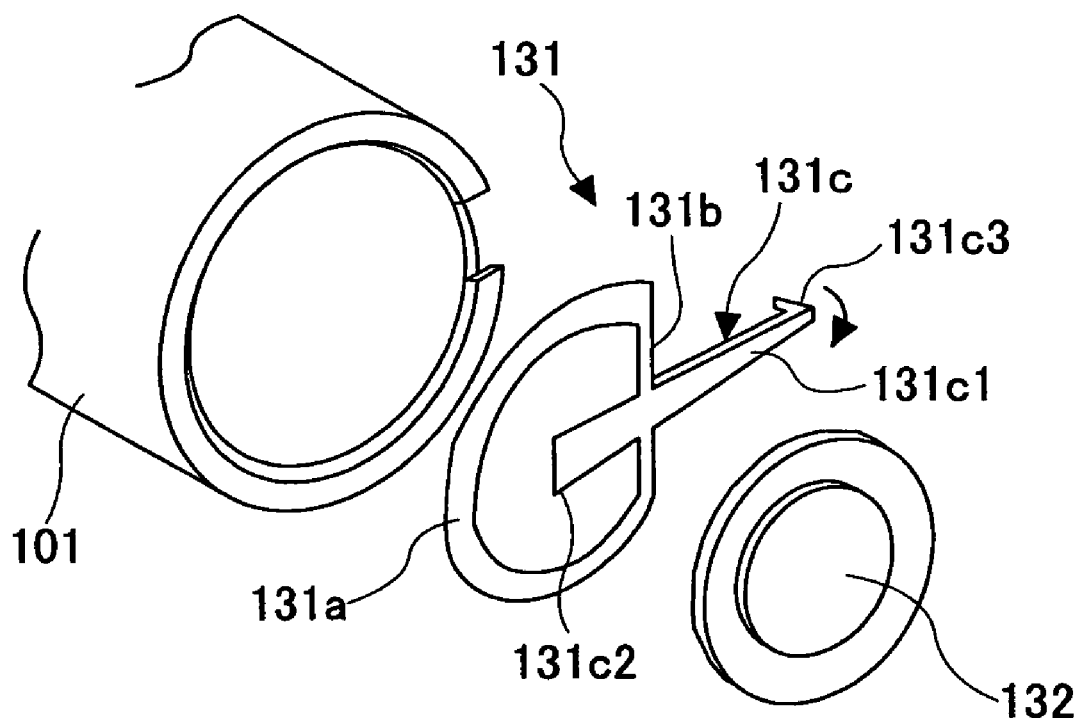
FIG. 8 is an exploded view of the second lock mechanism of the liquid fuel cartridge.

The liquid fuel cartridge 100 has a second liquid fuel cartridge lock mechanism 130. As shown in FIG. 8, this lock mechanism 130 has a lock arm member 131 and a push button 132 incorporated into the X2-side end surface of the liquid fuel tank 101. The lock arm member 131 includes a C-shaped frame 131a, an I-shaped torsion spring 131b that extends between both ends of the frame 131a, and an arm 131c that crosses the torsion spring 131b and extends in the Y1-Y2 directions. The frame 131a, the torsion spring 131b, and the arm 131c are integrally formed. The arm 131c includes a lock arm 131c1 that extends in the Y2 direction and a receiving arm 131c2 that extends in the Y1 direction. The arm 131c also includes a hook 131c3 at the end of the lock arm 131c1. The hook 131c3 is to be engaged with the concave portion 73 of the liquid fuel cell unit 11. The push button 132 is arranged to cover the receiving arm 131c2.

Next, the use and the usage situation of the liquid fuel cell system 10 are described.

FIGS. 9A through 9F schematically illustrate the movement of the methanol solution 150.

[Preparation for Power Generation (Preparation for Charging)]

As shown in FIGS. 9A and 10A, the insertion portion 102 of the liquid fuel cartridge 100 faces the insertion receiving portion 19 of the liquid fuel cell unit 11. As shown in FIGS. 9B and 10B, the lid member 70 is then pushed to open, and the insertion portion 102 is inserted into the insertion receiving portion 19 until it reaches the predetermined position. Thus, the liquid fuel cartridge 100 is attached to the liquid fuel cell unit 11.

As also shown in FIG. 7B, the following five situations are observed. The first situation is that the hook 131c3 is engaged with the concave portion 73, and the liquid fuel cartridge 100 and the liquid fuel cell unit 11 are locked together by the second liquid fuel cartridge lock mechanism 130. The second situation is that the rib 71 cuts into the gasket 120, and seals the liquid fuel cartridge 100 and the liquid fuel cell unit 11 together. The third situation is that the rectangular shaft 45 is engaged with the concave portion 44a of the cam 44, and thus completes the interlock mechanism 40. The fourth situation is that the protrusions 56 and 57 push the top ends of the arms 52b and 52c, respectively, to slide the lock member 52 in the Y2 direction, and the rod 52a then comes out of the concave portion 51a to release the operations knob lock mechanism 50. The fifth situation is that the communications path between the liquid fuel cartridge 100 and the liquid fuel cell unit 11 becomes closed.

The operations knob 41 is then rotated clockwise through 90 degrees. As shown in FIGS. 9C and 10C, the valve 21 is rotated through 90 degrees, and the valve 111 is also rotated through 90 degrees in synchronization with the valve 21. As a result, the valve unit 20 and the valve unit 110 are both opened, and a path is formed so that the liquid fuel cartridge 100 and the liquid fuel cell unit 11 communicate with each other.

The liquid fuel cell system 10 is positioned so that the liquid fuel cartridge 100 is located above the liquid fuel cell unit 11. In this arrangement, the methanol solution 150 in the liquid fuel cartridge 100 flows through the path via the slits 111*a* and 12*a* by virtue of gravity, and flows into the liquid fuel cell unit 11.

The liquid fuel cartridge 100 and the liquid fuel cell unit 11 are sealed by the rib 71 and the gasket 120, so that the methanol solution 150 is prevented from leaking out.

The operator checks through the transparent window 80 that the methanol solution 150 is supplied into the liquid fuel cell unit 11. The operator then rotates the operations knob 41 counterclockwise through 90 degrees, thereby returning the operations knob 41 to the original position. By doing so, the valves 21 and 111 are rotated through 90 degrees in synchronization, and the valve units 20 and 110 are both closed as shown in FIGS. 9C and 11A. Thus, the communications path between the liquid fuel cartridge 100 and the liquid fuel cell unit 11 is closed.

[Power Generation (Charging)]

The liquid fuel cell system 10 is horizontally positioned as shown in FIG. 11B, and a folded portable telephone 200 is set onto the portable telephone mounting portion 31 as shown in FIG. 2. The terminals 202 and 203 of the battery 201 are then connected to the power supply terminals 16 and 17, respectively.

As the cells 14 are supplied with the methanol solution 150, power generation is started to charge the battery 201.

Since the cells 14 and the gas permeable films 15 for discharging $CO_2$ are provided on the upper surface 13*a* and the lower surface 13*b* of the main body 13, the methanol solution 150 is supplied to some of the cells 14 to generate power, even when the liquid fuel cell system 10 is not in the horizontal position shown in FIG. 11B. In other words, the methanol solution 150 is supplied to at least one of the cells 14, even when the liquid fuel cell system 10 is not horizontally positioned. Thus, the liquid fuel cell system 10 does not have a particular orientation in placement.

[Completion of Power Generation (Completion of Charging), and Collection of Methanol Solution]

Figure 12C:
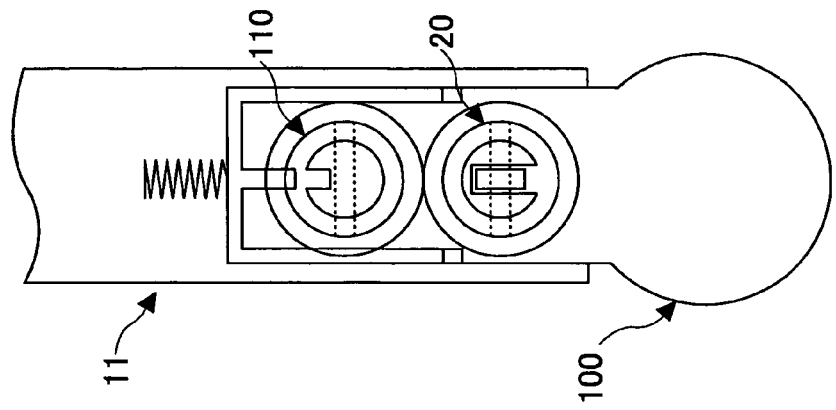
FIGS. 12A through 12C illustrate the state of the liquid fuel cell system at the time of collecting the methanol solution.
Figure 12B:
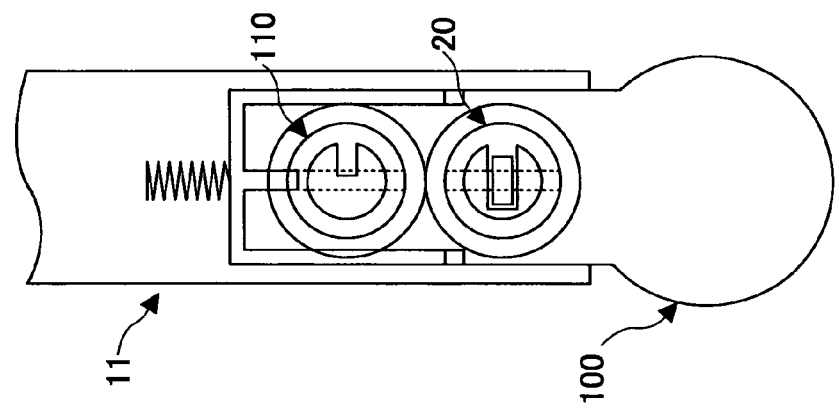
Figure 12A:
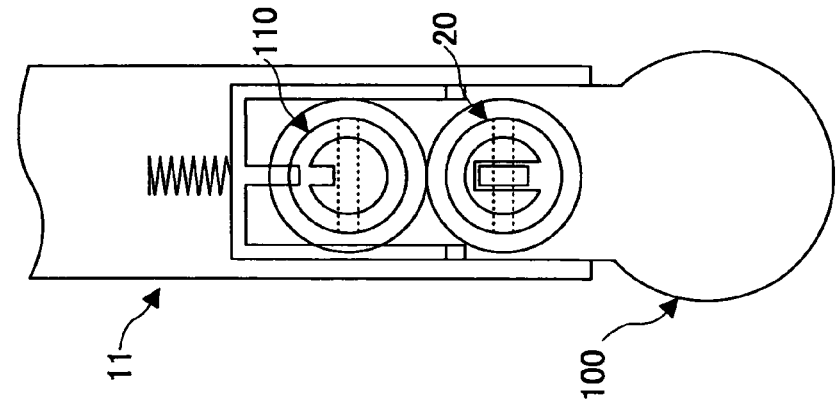

After the battery 201 is charged, the folded portable telephone 200 is removed, and the liquid fuel cell system 10 is positioned so that the liquid fuel cartridge 100 is located below the liquid fuel cell unit 11 as shown in FIGS. 9D and 12A. This is the opposite of the situation shown in FIGS. 9B and 10B. The operations knob 41 is then rotated clockwise again through 90 degrees. As a result, the valves 21 and 111 are rotated through 90 degrees in synchronization, and the valve units 20 and 110 are both opened as shown in FIGS. 9E and 12B. Thus, the communications path between the liquid fuel cell unit 11 and the liquid fuel cartridge 100 is opened, and the methanol solution 150 remaining in the liquid fuel cell unit 11 flows through the path via the slits 12*a* and 111*a* by virtue of gravity, as shown in FIG. 9E. By flowing in this manner, the remaining methanol solution 150 returns to the liquid fuel cartridge 100.

The liquid fuel cartridge 100 and the liquid fuel cell unit 11 are sealed with the rib 71 and the gasket 120, so that the methanol solution 150 is prevented from leaking out.

After checking that the liquid fuel cell unit 11 is emptied, the operations knob 41 is rotated counterclockwise through 90 degrees, and is returned to the original position. By doing so, the valves 21 and 111 are rotated through 90 degrees in synchronization, and the valve units 20 and 110 are both closed, as shown in FIGS. 9F and 12C. Thus, the communications path between the liquid fuel cartridge 100 and the liquid fuel cell unit 11 is closed.

As the liquid fuel cell unit 11 is emptied, the solid polymer films that form the cells 14 become separated from the methanol solution 150 so that unnecessary deterioration of the solid polymer films can be prevented.

When necessary, the liquid fuel cartridge 100 is removed from the liquid fuel cell unit 11. In the situation illustrated in FIGS. 9F and 12C, the first liquid fuel cartridge lock mechanism 60 is in an unlocked state in which the concave portion 44*a* lies in the Y1 direction so that the rectangular shaft 45 can come out of the concave portion 44*a*. When an operator pushes the push button 132 to grab the liquid fuel cartridge 100, the hook 131*c*3 comes out of the concave portion 73 of the liquid fuel cell unit 11, so that the second liquid fuel cartridge lock mechanism 130 is unlocked and the liquid fuel cartridge 100 becomes detachable from the liquid fuel cell unit 11. The operator then grabs and pulls the liquid fuel cartridge 100 to detach the liquid fuel cartridge 100 from the liquid fuel cell unit 11. When the battery 201 is charged again, the operation shown in FIGS. 9A through 9F and FIGS. 10A through 12C is repeated. Thus, the liquid fuel cartridge 100 can be handled as if it were a dry battery.

In the situation where the valve units 20 and 110 are both opened and the communications path between the liquid fuel cartridge 100 and the liquid fuel cell unit 11 is opened as shown in FIGS. 9C, 9E, 10C, and 12B, the first liquid fuel cartridge lock mechanism 60 is locked, as the concave portion 44*a* with which the rectangular shaft 45 is engaged lies in the Z1 direction so as to prevent the rectangular shaft 45 from coming out of the concave portion 44*a*. In this situation, an operator cannot detach the liquid fuel cartridge 100 from the liquid fuel cell unit 11 by pulling the liquid fuel cartridge 100. Thus, the methanol solution 150 does not inadvertently leak out.

The amount of the methanol solution 150 returned to the liquid fuel cartridge 100 can be observed through the transparent windows 103 and 104, and can be prevented from exceeding the full capacity of the liquid fuel cartridge 100 in accordance with the graded scales put on the windows 103 and 104.

In the charging situation shown in FIG. 11B, the second liquid fuel cartridge lock mechanism 130 is locked, so that the liquid fuel cartridge 100 is prevented from coming off the liquid fuel cell unit 11 even if the liquid fuel cell system 10 that is being charged is transported and receives an impact during the transporting.

Next, other embodiments of the present invention are described.

Figure 13:
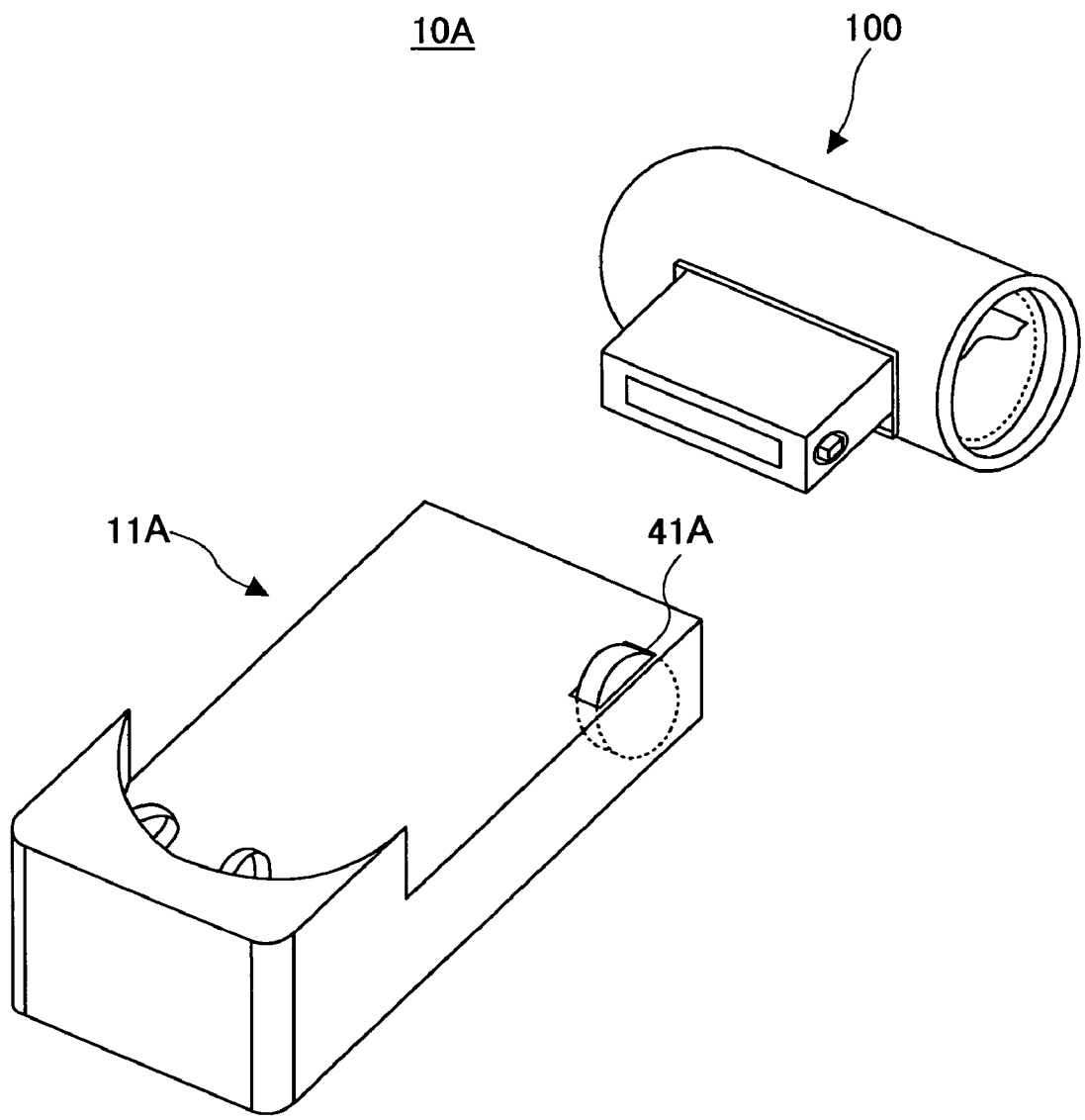
FIG. 13 illustrates a liquid fuel cell system in accordance with a second embodiment of the present invention.

FIG. 13 illustrates a liquid fuel cell system 10A of a second embodiment of the present invention. The liquid fuel cell system 10A includes a liquid fuel cell unit 11A and the liquid fuel cartridge 100. The liquid fuel cell system 10A has part of an operations knob 41A protruding from the upper surface of the liquid fuel cell unit 11A. The operations knob 41A is equivalent to the operations knob 41 of the interlock mechanism 40 of FIG. 5. An operator rotates the operations knob 41A with the tip of a finger.

Figure 14:
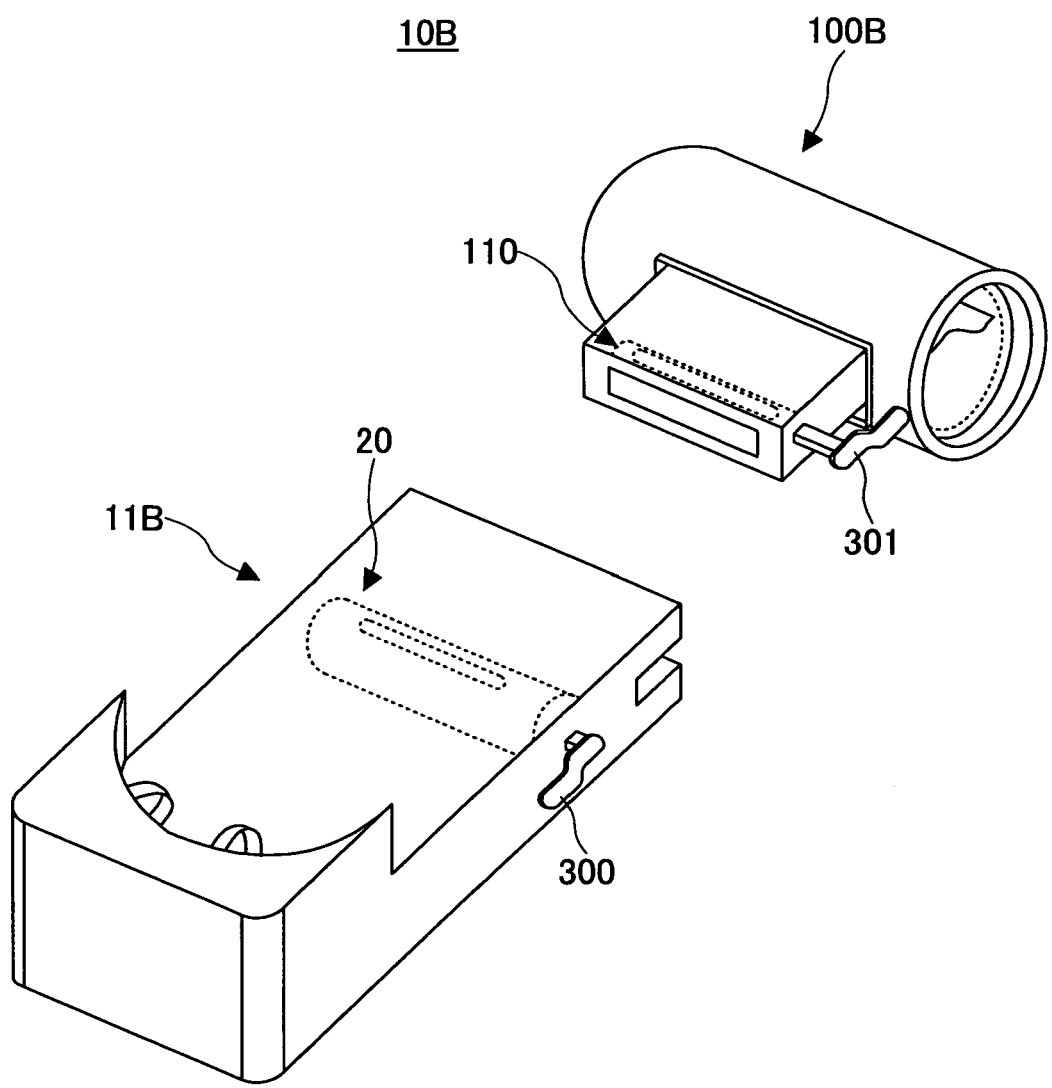
FIG. 14 illustrates a liquid fuel cell system in accordance with a third embodiment of the present invention.
Figure 15:
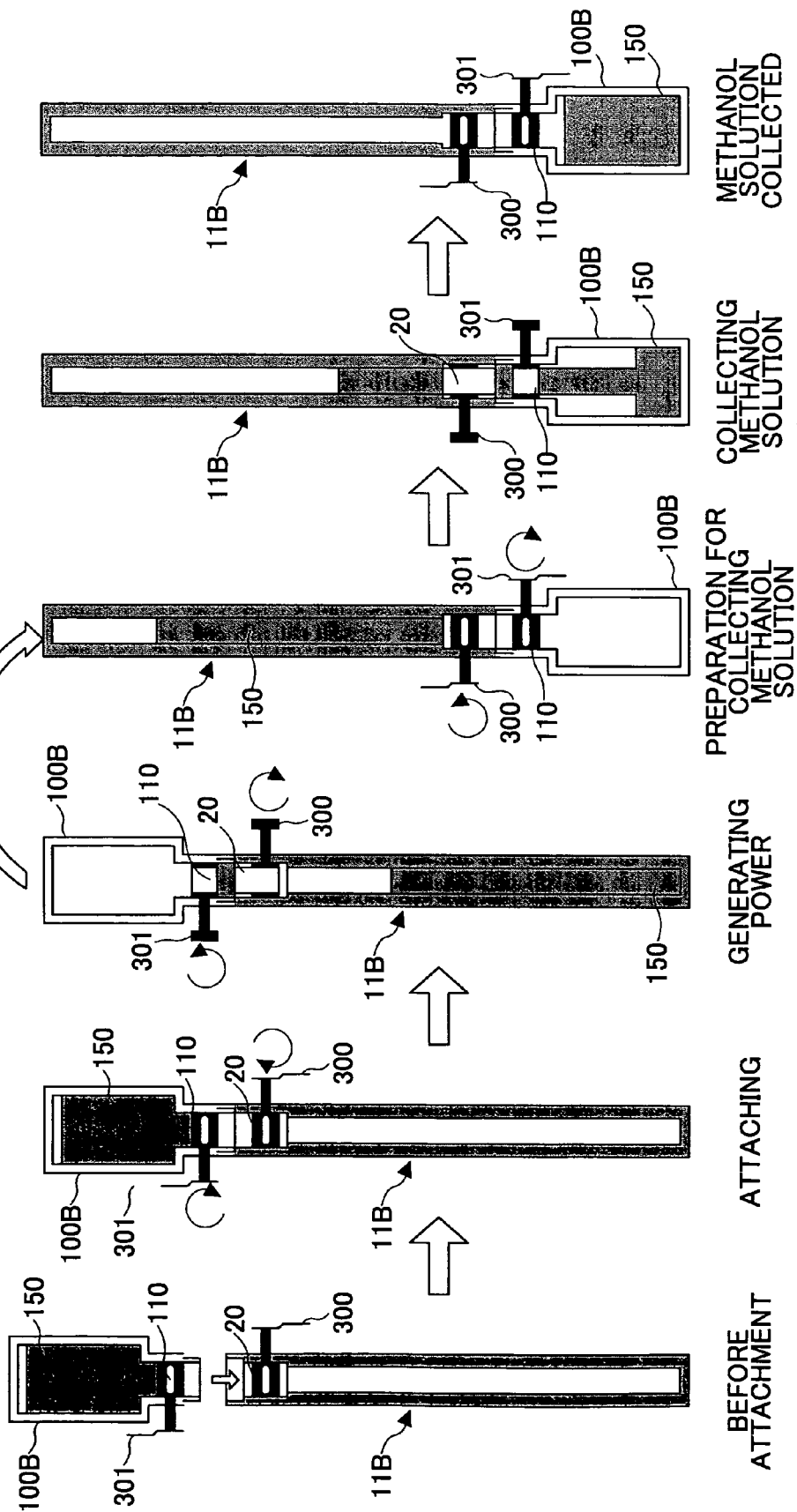
FIGS. 15A through 15F schematically illustrate the state of the liquid fuel cell system in use, and the movement of the methanol solution according to the third embodiment.

FIG. 14 illustrates a liquid fuel cell system 10B of a third embodiment of the present invention. The liquid fuel cell system 10B includes a liquid fuel cell unit 11B and a liquid fuel cartridge 100B. This liquid fuel cell system 10B has an operations knob 300 provided on the liquid fuel cell unit 11B to operate the valve unit 20, and an operations knob 301 provided on the liquid fuel cartridge 100B to operate the valve unit 110, instead of the interlock mechanism 40 shown in FIG. 5. The operations knob 300 and the operations knob 301 can be operated independently of each other.

After the liquid fuel cartridge 100B is attached to the liquid fuel cell unit 11B, the operations knob 300 and the operations knob 301 are operated as shown in FIGS. 15B through 15F.

Figure 16:
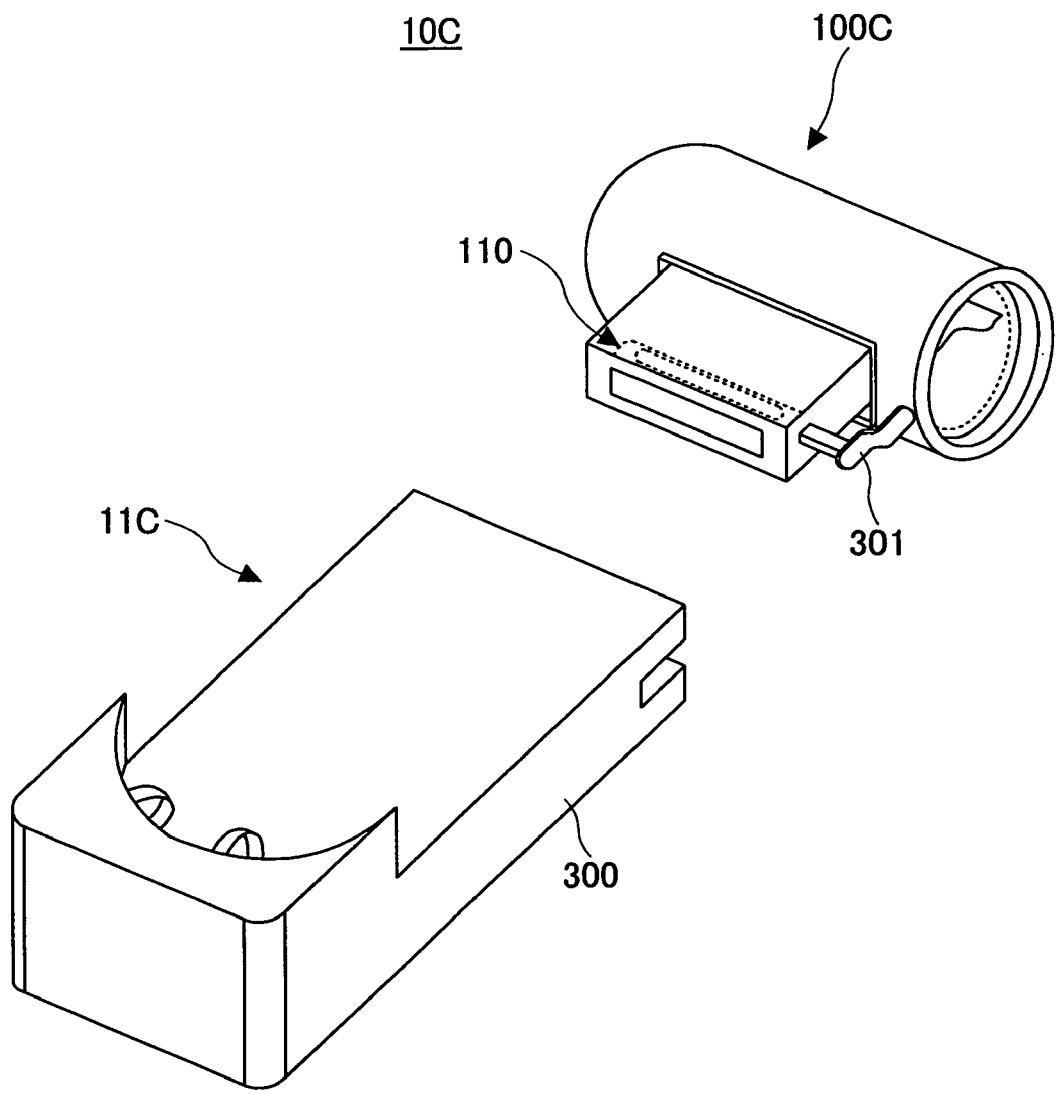
FIG. 16 illustrates a liquid fuel cell system in accordance with a fourth embodiment of the present invention.

FIG. 16 illustrates a liquid fuel cell system 10C of a fourth embodiment of the present invention. The liquid fuel cell system 10C includes a liquid fuel cell unit 11C and a liquid fuel cartridge 100C. This liquid fuel cell system 10C has the valve unit 110 and the operations knob 301 that are provided on the liquid fuel cartridge 100C. The operations knob 301 is used to operate the valve unit 110. The liquid fuel cell unit 11C of the liquid fuel cell system 10C does not have a valve unit or an operations knob.

After the liquid fuel cartridge 100C is attached to the liquid fuel cell unit 11C, the operations knob 301 is operated to open and close the communications path between the liquid fuel cartridge 100C and the liquid fuel cell unit 11C.

Figure 17:
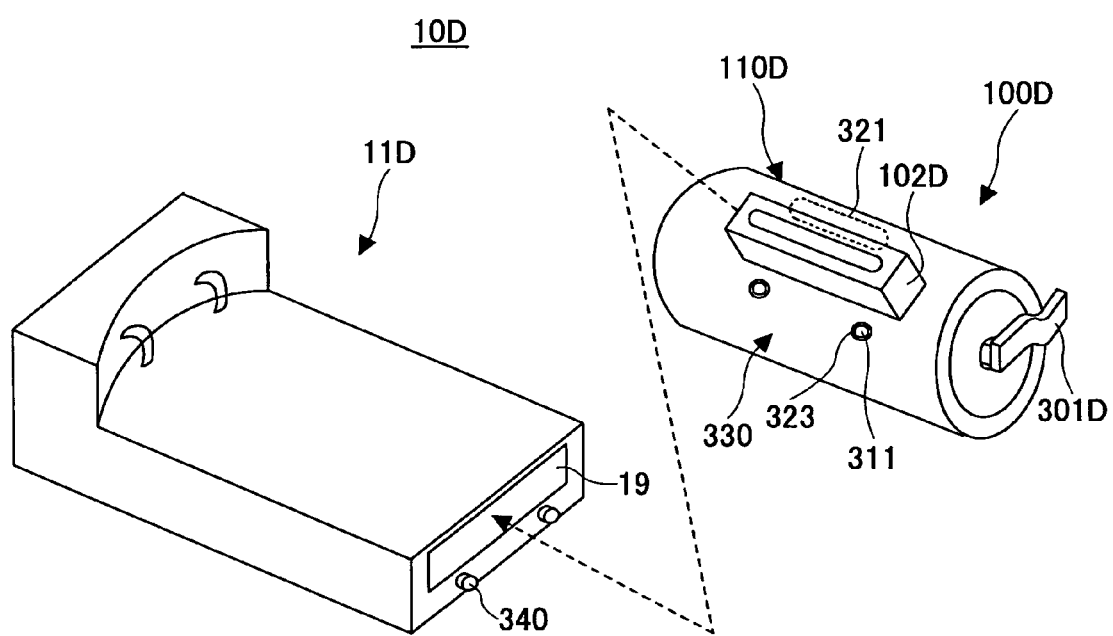
FIG. 17 illustrates a liquid fuel cell system in accordance with a fifth embodiment of the present invention.
Figure 18:
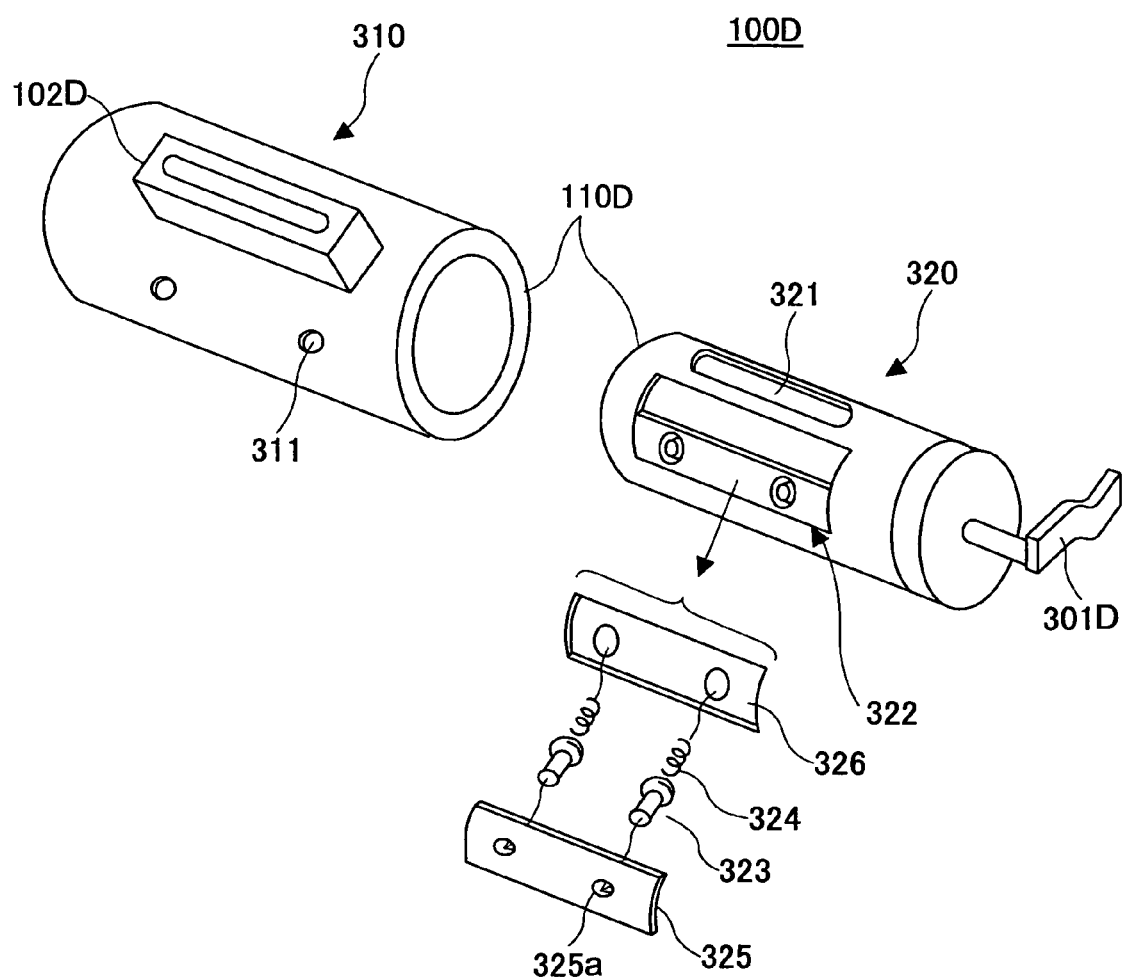
FIG. 18 is an exploded perspective view of the liquid fuel cartridge shown in FIG. 17.

FIG. 17 illustrates a liquid fuel cell system 10D of a fifth embodiment of the present invention. The liquid fuel cell system 10D includes a liquid fuel cell unit 11D and a liquid fuel cartridge 100D. This liquid fuel cell system 10D is a modification of the liquid fuel cell system 10C shown in FIG. 16. As also shown in FIG. 18, the liquid fuel cartridge 100D has a columnar liquid fuel tank 320 rotatably incorporated into a cylindrical shell 310. The liquid fuel tank 320 and the shell 310 form a valve unit 110D. The valve unit 110D is normally locked and closed by a lock mechanism 330 (FIG. 17). The lock is released when the liquid fuel cartridge 100D is attached to the liquid fuel cell unit 1D.

As shown in FIG. 18, the liquid fuel tank 320 has an operations knob 301D formed on its end surface. The liquid fuel tank 320 has a slit 321 and a lock pin mechanism 322 formed on its circumferential surface. The lock pin mechanism 322 includes lock pins 323, springs 324, and a cover plate 325. The lock pin mechanism 322 is inserted into a concave portion 326 formed on the circumferential surface of the liquid fuel tank 320, with the lock pins 323 protruding through holes 325a of the cover plate 325.

As shown in FIG. 18, the shell 310 has a protruding insertion portion 102D and holes 311.

The valve unit 110D is formed by the liquid fuel tank 320 and the shell 310. The slit 321 deviates from the position of the insertion portion 102D and is covered with the inner circumferential surface of the shell 310. In this situation, the valve unit 110D is closed. When the slit 321 is moved to the position corresponding to the insertion portion 102D, the valve unit 110D is opened.

Figure 19A:
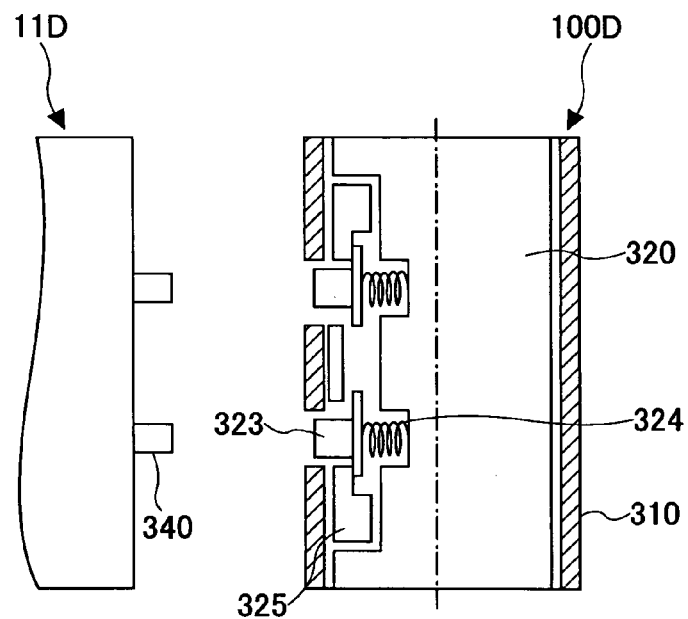
FIGS. 19A and 19B illustrate an operations knob lock releasing process that accompanies the attachment of the liquid fuel cartridge.

The lock mechanism 330 is formed by the lock pin mechanism 322 and the holes 311 of the shell 310. As shown in FIG. 19A, the lock pins 323 are normally engaged with the holes 311, so that the lock mechanism 330 is in a locked state. When the valve unit 110D is closed, the lock mechanism 330 is in the locked state, and the operations knob 301D cannot be operated.

As shown in FIG. 17, the liquid fuel cell unit 11D has protrusions 340 formed on the insertion receiving portion 19.

Figure 19B:
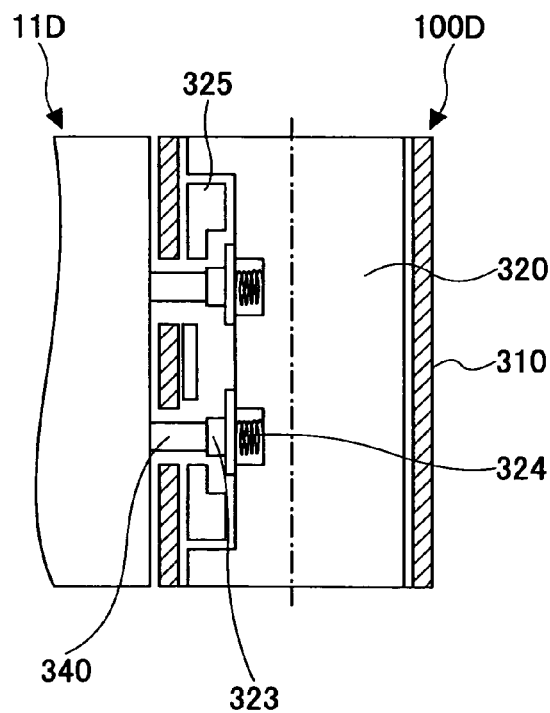

As shown in FIGS. 19A and 19B, when the liquid fuel cartridge 100D is connected to the liquid fuel cell unit 11D by inserting the insertion portion 102D into the insertion receiving portion 19, the lock pins 323 are pushed to retract by the protrusions 340, so that the lock mechanism 330 is released to allow the operation of the operations knob 301D.

Figure 20:
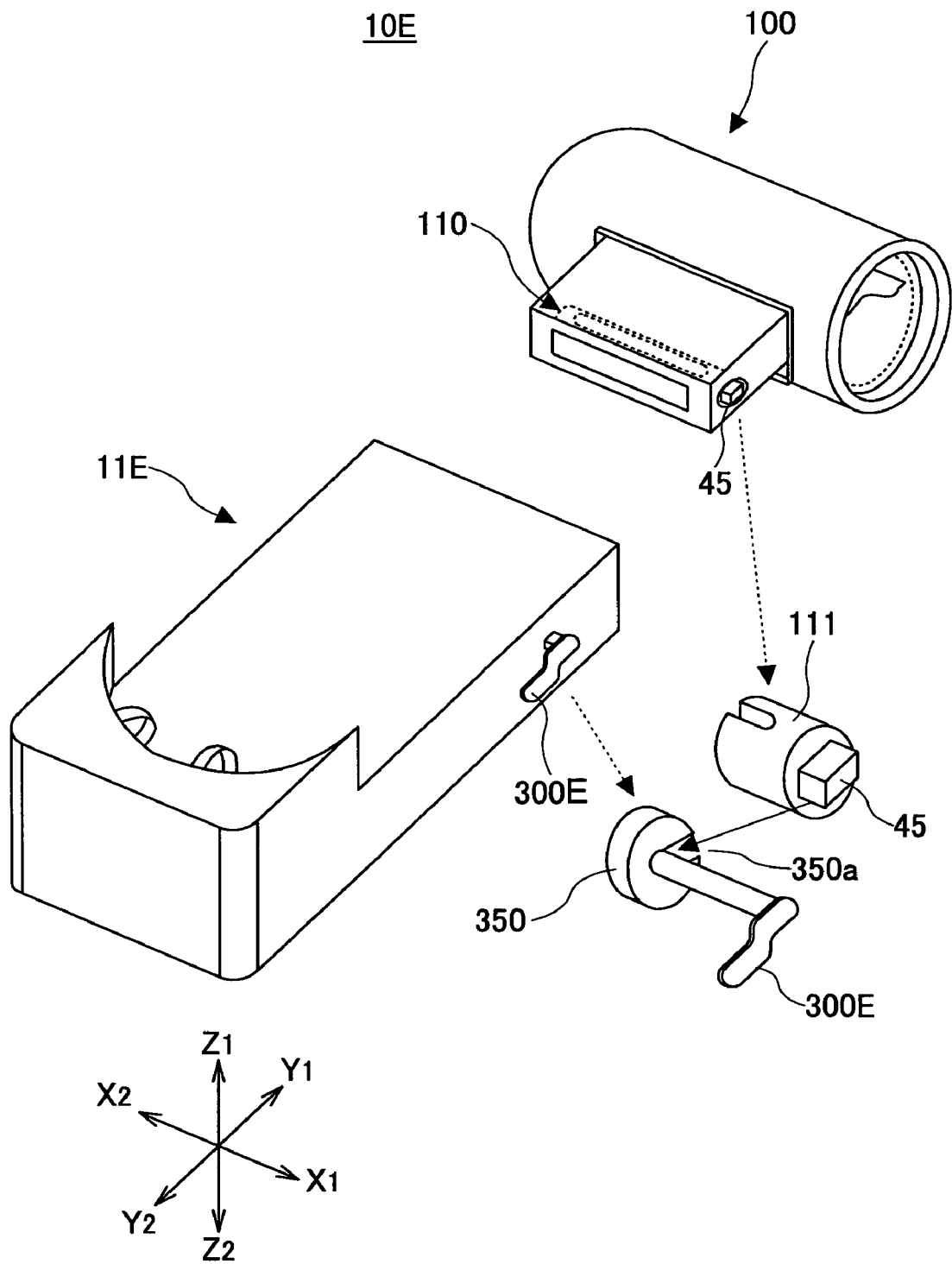
FIG. 20 illustrates a liquid fuel cell system in accordance with a sixth embodiment of the present invention.

FIG. 20 illustrates a liquid fuel cell system 10E of a sixth embodiment of the present invention. The liquid fuel cell system 10E includes a liquid fuel cell unit 11E and the liquid fuel cartridge 100. This liquid fuel cell system 10E only has the valve unit 110 provided on the liquid fuel cartridge 100, and has an operations knob 300E provided on the liquid fuel cell unit 11E. The liquid fuel cartridge 100 includes the valve unit 110 while the liquid fuel cell unit 11E does not include a valve unit.

The operations knob 300E includes a cam 350 having a concave portion 350a formed therein. When the liquid fuel cartridge 100 is connected to the liquid fuel cell unit 11E, the rectangular shaft 45 is engaged with the concave portion 350a of the cam 350, so that the valve unit 110 can be operated by turning the operations knob 300E.

Figure 21:
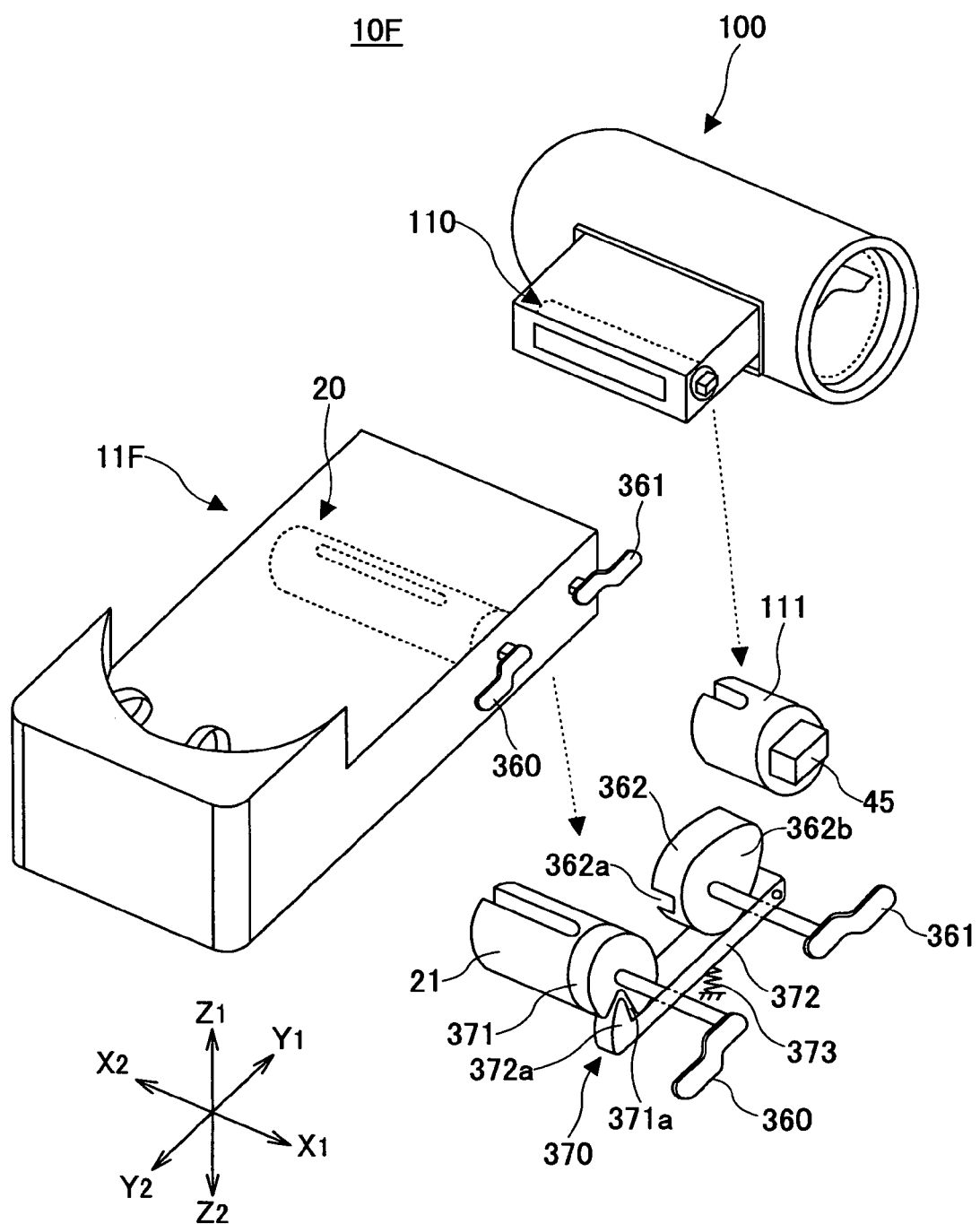
FIG. 21 illustrates a liquid fuel cell system in accordance with a seventh embodiment of the present invention.

FIG. 21 illustrates a liquid fuel cell system 10F of a seventh embodiment of the present invention. The liquid fuel cell system 10F includes a liquid fuel cell unit 11F and the liquid fuel cartridge 100. This liquid fuel cell system 10F has the valve unit 110 provided on the liquid fuel cartridge 100, and the valve unit 20 provided on the liquid fuel cell unit 11F. An operations knob 360 that is used to operate the valve unit 20 and an operations knob 361 that is used to operate the valve unit 110 are provided on the liquid fuel cell unit 11F. The liquid fuel cell unit 11F also has an operations knob lock mechanism 370 to lock the operations knob 360.

The operations knob 361 includes a cam 362. The cam 362 includes a groove 362a and a protrusion 362b. The groove 362a extends in the Y1 direction, and the protrusion 362b extends in the Y1 direction.

The operations knob lock mechanism 370 has a structure in which a protrusion 372a formed at the Y2-side end of a lock bar 372 is engaged with a concave portion 371a of a cam 371 that is integrally formed with the operations knob 360. The lock bar 372 is rotatably supported at its Y1-side end, and extends below the cam 362. The lock bar 372 is pushed in the Z1 direction by a spring 373.

Before the liquid fuel cartridge 100 is attached to the liquid fuel cell unit 11F, the operations knob lock mechanism 370 locks the operations knob 360, so that the operations knob 360 cannot be used. When the liquid fuel cartridge 100 is attached to the liquid fuel cell unit 11F, the rectangular shaft 45 is engaged with the groove 362a of the cam 362.

After the liquid fuel cartridge 100 is attached to the liquid fuel cell unit 11F, the operations knob 361 is operated to open the valve unit 110. Through the movement of the operations knob 361, the protrusion 362b pushes the lock bar 372 in the Z2 direction, so that the protrusion 372a comes out of the concave portion 371a to release the lock of the operations knob lock mechanism 370. The operations knob 360 is then operated to open the valve unit 20.

Figure 22A:
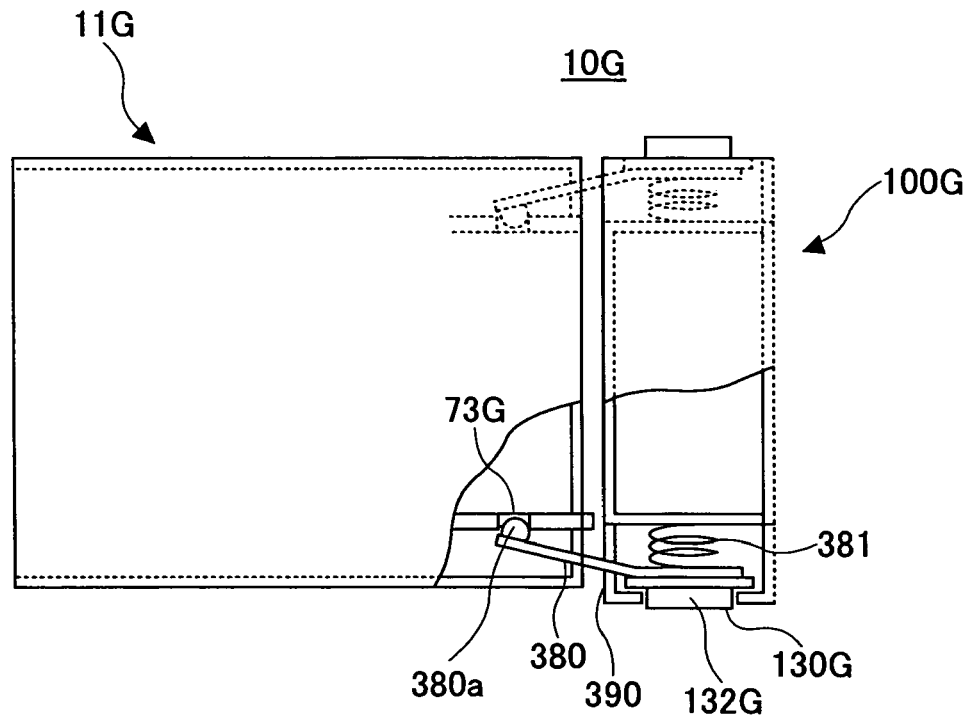
FIGS. 22A and 22B illustrate a liquid fuel cell system in accordance with an eighth embodiment of the present invention.

FIG. 22A illustrates a liquid fuel cell system 10G of an eighth embodiment of the present invention. The liquid fuel cell system 10G includes a liquid fuel cell unit 11G and a liquid fuel cartridge 100G. A second liquid fuel cartridge lock mechanism 130G is provided in the liquid fuel cartridge 100G.

Figure 22B:
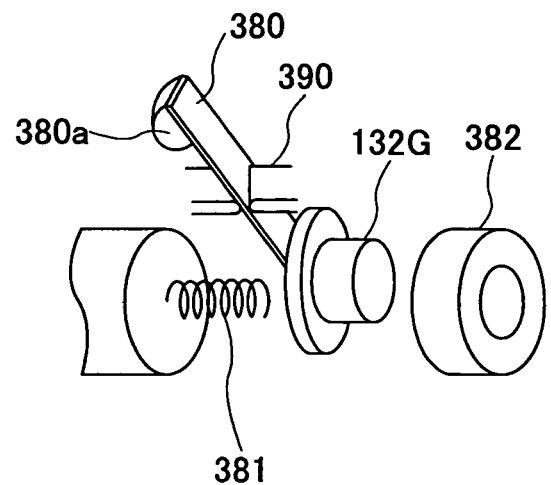

The second liquid fuel cartridge lock mechanism 130G is a modification of the second liquid fuel cartridge lock mechanism 130 shown in FIG. 8, and includes a lock lever 380 supported by a supporting portion 390, a coil spring 381, a push button 132G, and a cover 382, as shown in FIG. 22B. This second liquid fuel cartridge lock mechanism 130G is formed on both sides of the liquid fuel cartridge 100G. A concave hook 380a formed at the top end of the lock lever 380 is engaged with a concave portion 73G of the liquid fuel cell unit 11G.

Figure 23:
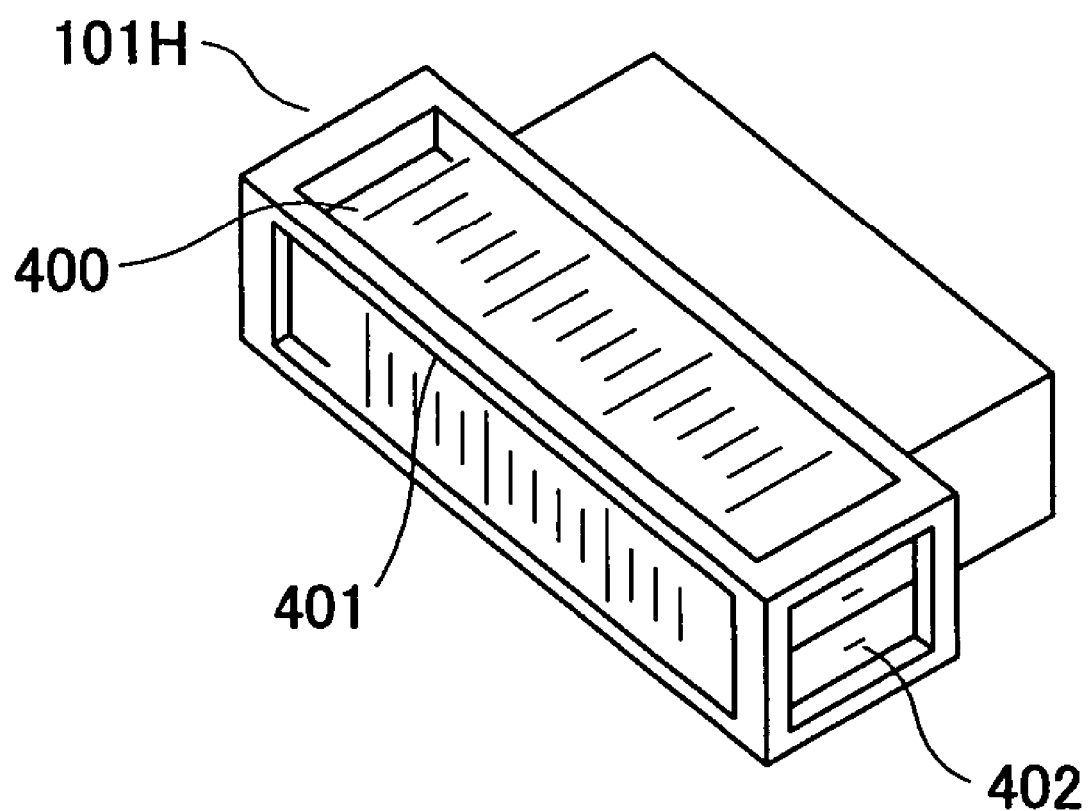
FIG. 23 illustrates a liquid fuel cartridge of yet another embodiment of the present invention.

FIG. 23 illustrates a liquid fuel cartridge 100H of yet another embodiment of the present invention. The liquid fuel cartridge 100H has a liquid fuel tank 101H that is a rectangular parallelepiped having transparent windows 400, 401, and 402 on the upper surface, a side surface, and an end surface, respectively.

Figure 24A:
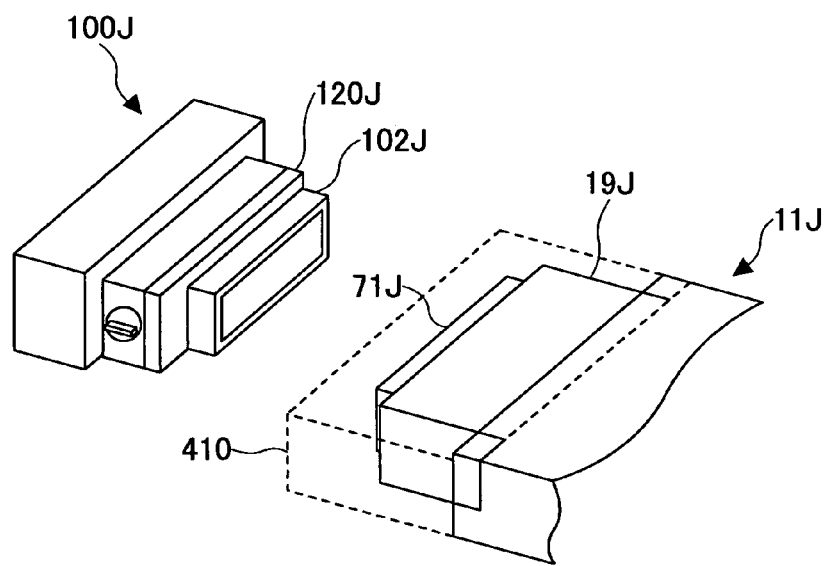
FIGS. 24A through 24C illustrate the insertion portion of a liquid fuel cartridge that faces the insertion receiving portion of a liquid fuel cell unit of still another embodiment of the present invention.
Figure 24B:
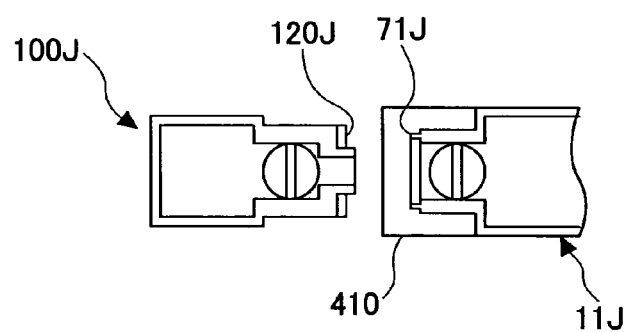
Figure 24C:
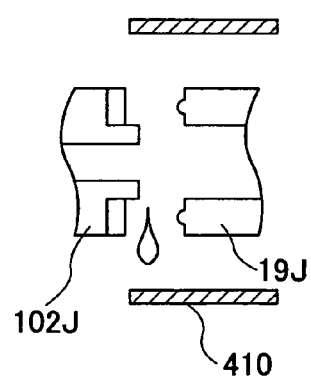

FIGS. 24A through 24C illustrate an insertion portion 102J of a liquid fuel cartridge 100J and an insertion receiving portion 19J of a liquid fuel cell unit 11J of still another embodiment of the present invention. The insertion portion 102J and the insertion receiving portion 19J face each other in FIGS. 24A through 24C. A rib 71J formed at the opening end of the insertion receiving portion 19J cuts into a gasket 120J formed at the top end of the insertion portion 102J, thereby sealing the liquid fuel cartridge 100J and the liquid fuel cell unit 11J together.

When the liquid fuel cartridge 100J is detached from the liquid fuel cell unit 11J, the liquid fuel remaining on the rim of the insertion receiving portion 19J or the insertion portion 102J might drip down. To counter this problem, a liquid fuel absorbing sheet 410 that absorbs the liquid fuel is provided to surround the insertion receiving portion 19J of the liquid fuel cell unit 11J. The dripping liquid fuel is received by the liquid fuel absorbing sheet 410, and does not leak out.

Figure 25:
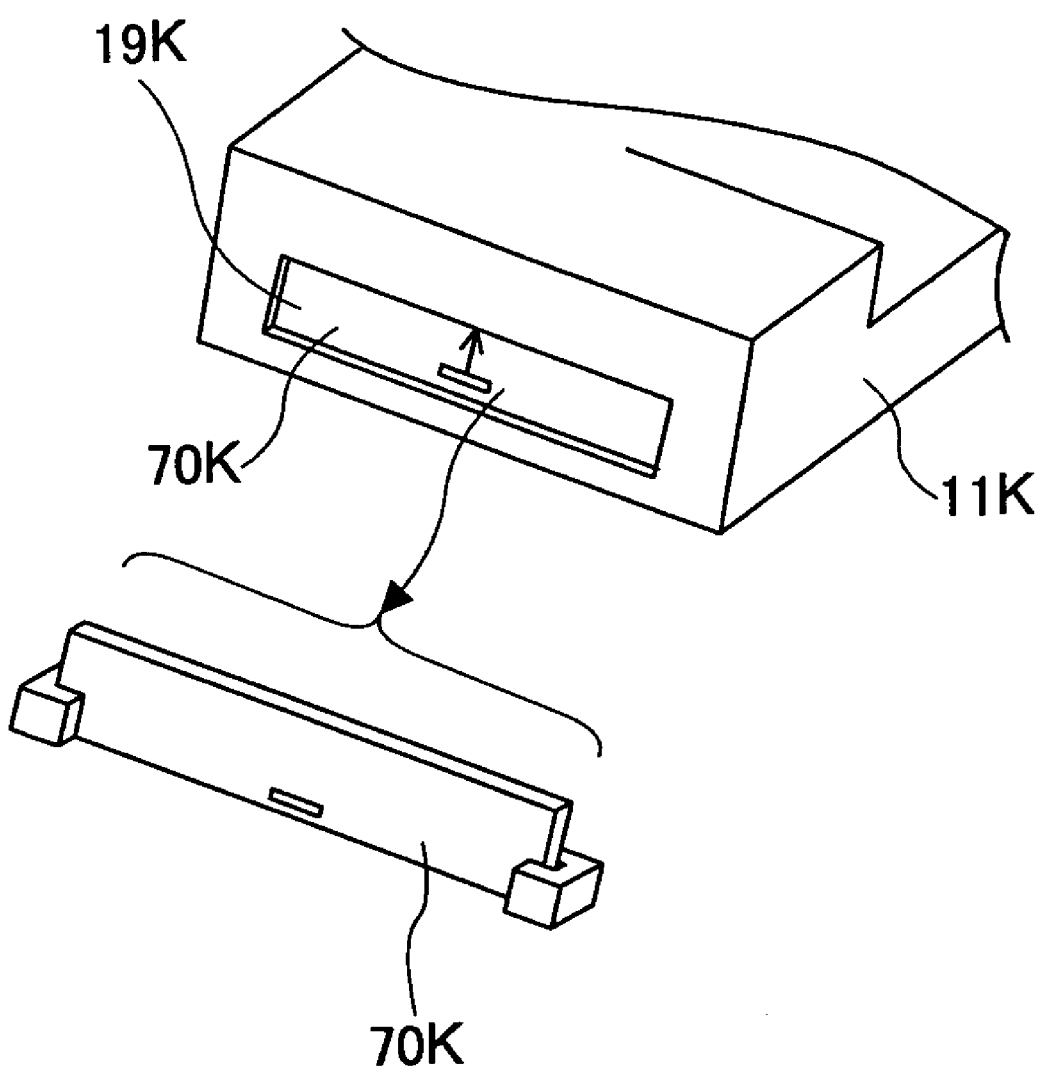
FIG. 25 illustrates a modification of the lid member shown in FIG. 3.

FIG. 25 illustrates a modification of the lid member 70 shown in FIG. 3. A lid member 70K that can slide in the vertical direction is provided on an insertion receiving portion 19K of a liquid fuel cell unit 11K. The insertion receiving portion 19K is opened when the lid member 70K is slidably lifted up.

Figure 26A:
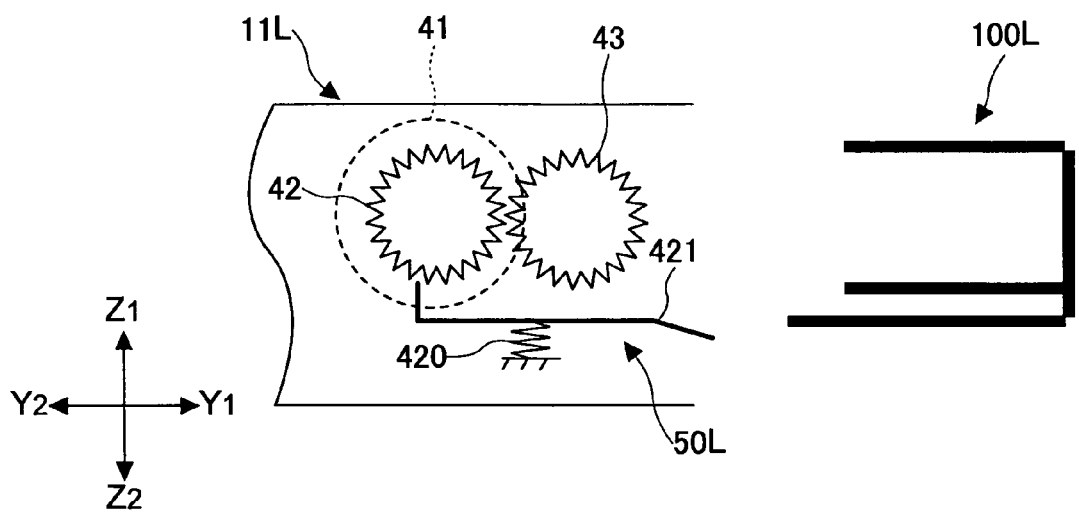
FIGS. 26A and 26B illustrate an operations knob lock mechanism in accordance with yet another embodiment of the present invention.
Figure 26B:
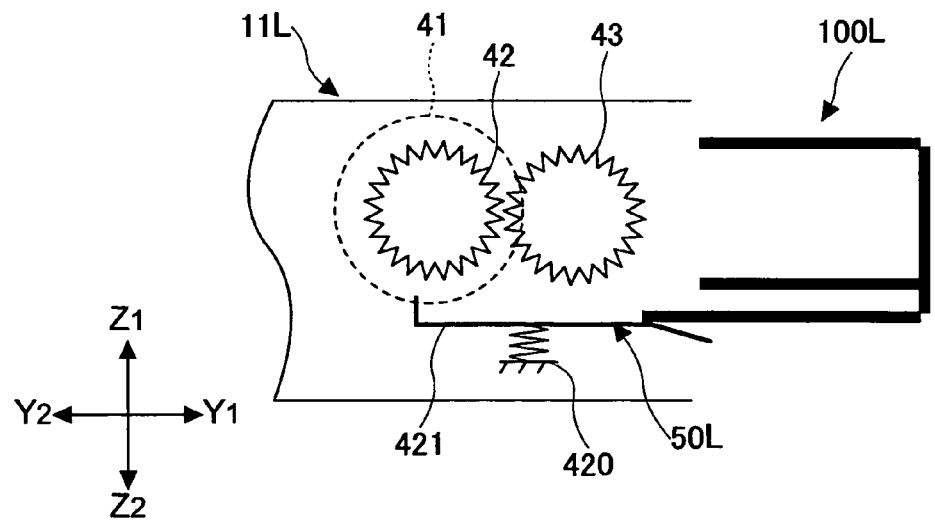

FIGS. 26A and 26B illustrate an operations knob lock mechanism 50L of yet another embodiment of the present invention. The operations knob lock mechanism 50L is unlocked by a liquid fuel cartridge 100L. As shown in FIG. 26A, a lock member 421 that is pushed by a spring member 420 is engaged with the first gear 42, and thus, the operations knob 41 is locked. When the liquid fuel cartridge 100L is attached to a liquid fuel cell unit 11L, the liquid fuel cartridge 100L moves the lock member 421 in the Z2 direction, as shown in FIG. 26B. As a result, the lock member 421 is disengaged from the first gear 42, and the operations knob 41 is unlocked.

Figure 27A:
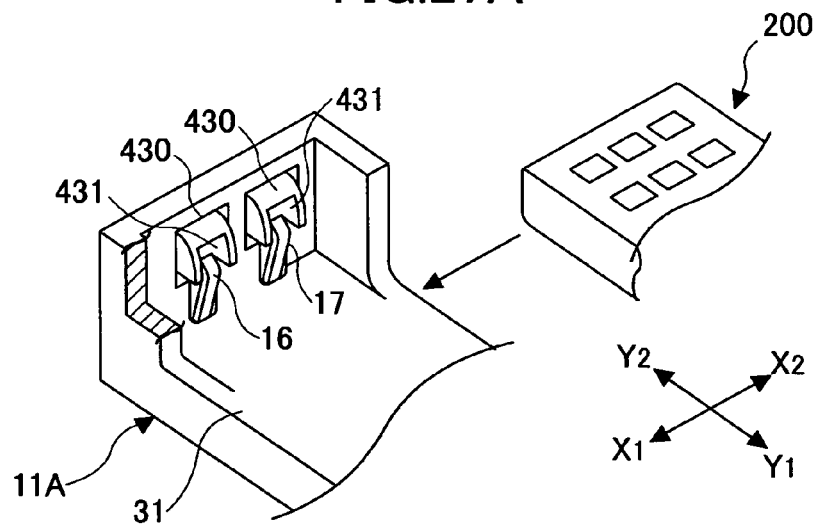
FIGS. 27A through 27C illustrate a power supply terminal cover.
Figure 27B:
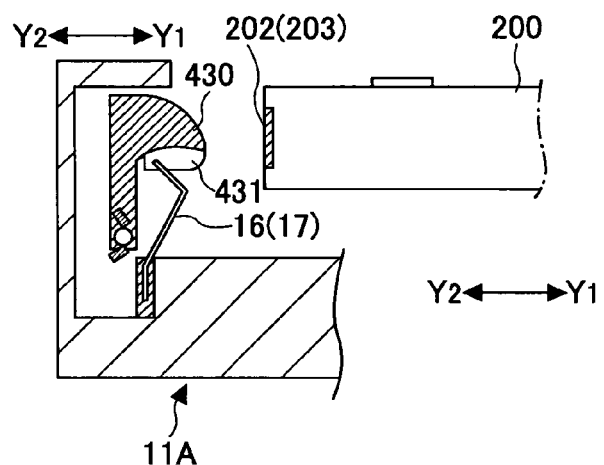
Figure 27C:
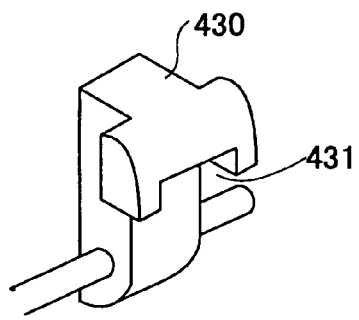

FIGS. 27A through 27C illustrate an example of a power supply terminal cover. As shown in FIGS. 27A and 27B, power supply terminal cover members 430 each having a shape shown in FIG. 27C are attached to the housing 11A. The power supply terminals 16 and 17 are normally accommodated in and protected by concave portions 431 of the power supply cover members 430. Accordingly, the power supply terminals 16 and 17 cannot be easily touched with hands. When the portable telephone 200 is set onto the portable telephone mounting portion 31, the power supply terminal cover members 430 are pushed by the portable telephone 200, so that the terminals 202 and 203 are connected to the power supply terminals 16 and 17, respectively.

Figure 28A:
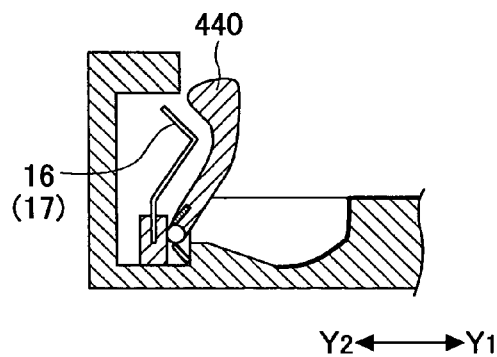
FIGS. 28A and 28B illustrate a modification of the power supply terminal cover.
Figure 28B:
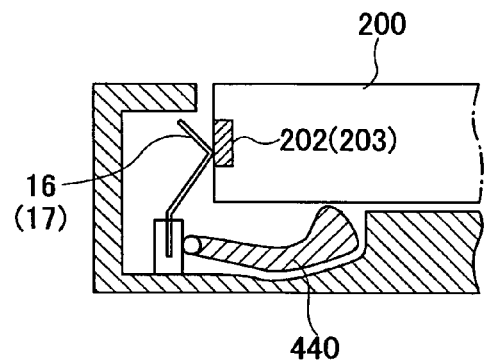

FIGS. 28A and 28B illustrate another example of the power supply terminal cover. As shown in FIG. 28A, each of power supply terminal cover members 440 is normally in a standing position, so that the Y1-side surfaces of the power supply terminals 16 and 17 are covered with the power supply terminal cover members 440. In the course of setting the portable telephone 200 onto the portable telephone mounting portion 31, the portable telephone 200 pushes the power supply terminal cover members 440 in the Y1 direction, and the power supply terminals 16 and 17 are exposed as shown in FIG. 28B. Thus, the terminals 202 and 203 are connected to the power supply terminals 16 and 17, respectively.

Figure 29:
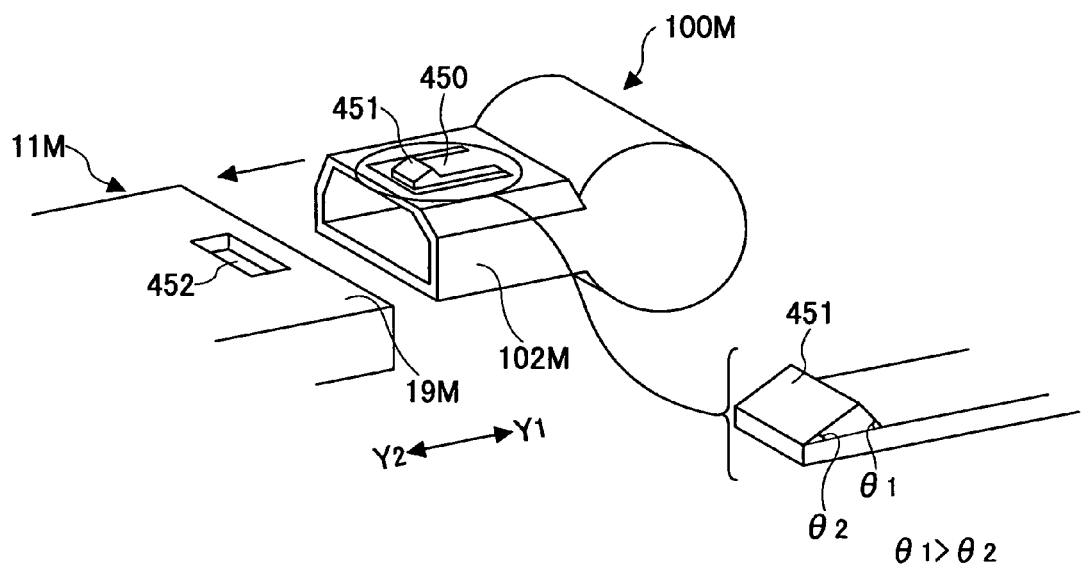
FIG. 29 illustrates a liquid fuel cartridge in accordance with yet another embodiment of the present invention.

FIG. 29 illustrates a liquid fuel cartridge 100M. This liquid fuel cartridge 100M has an arm 450 formed on its insertion portion 102M. The arm 450 has a lock claw 451 formed on its top end. The inclination angle θ1 on the back side of the lock claw 451 is greater than the inclination angle θ2 on the front side. The insertion portion 102M has a trapezoidal shape when seen from the Y2 side. The insertion receiving portion 19M of a liquid fuel cell unit 11M also has a trapezoidal shape. The liquid fuel cartridge 100M is inserted, with the insertion portion 102M facing the insertion receiving portion 19M. The lock claw 451 is then engaged with a slit 452 and is locked. Thus, the liquid fuel cartridge 100M is attached to the liquid fuel cell unit 11M.

Figure 30A:
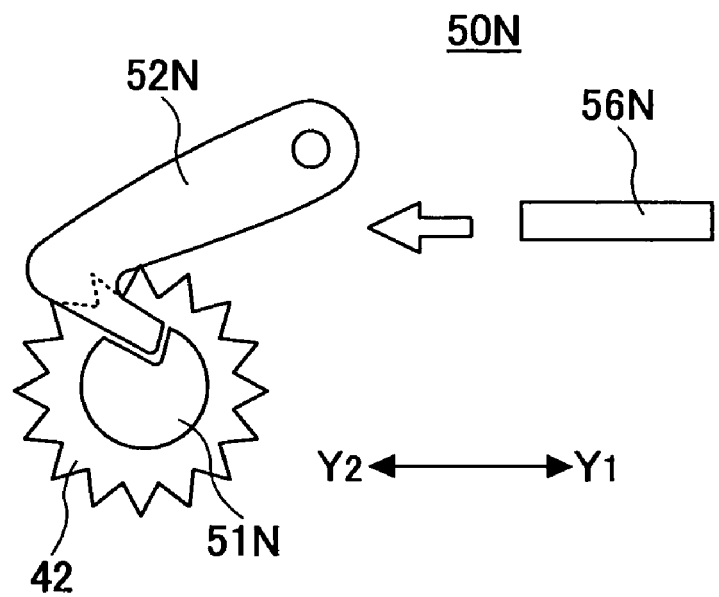
FIGS. 30A and 30B illustrate another example of the operations knob lock mechanism.
Figure 30B:
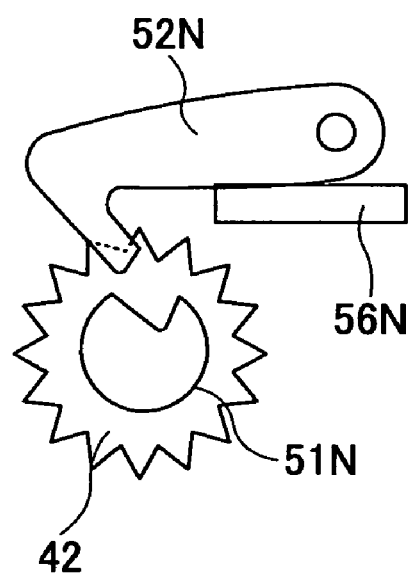

FIG. 30A illustrates an operations knob lock mechanism 50N. The first gear 42 is engaged with a lock mechanism 52N that can lock a cam 51N. When a liquid fuel cartridge is attached, a protrusion 56N pushes and rotates the lock member 52N, as shown in FIG. 30B. Thus, the lock is released.

FIGS. 31A through 31C illustrate a mechanism for restricting the rotation of the valve 21. A protrusion 460 is formed on the first gear 42 located at the end of the valve 21. A stopper 461 is attached to the liquid fuel cartridge. FIG. 31A shows the initial state in which the rotation angle of the valve 21 is 0 degrees, the valve 21 is "closed", the protrusion 460 is in contact with a side surface of the stopper 461, and clockwise rotation of the first gear 42 is prevented. FIG. 31B shows a state in which the first gear 42 and the valve 21 are rotated counterclockwise through 90 degrees, the rotation angle of the valve 21 is 90 degrees, and the valve 21 is "open". FIG. 31C shows a state in which the first gear 42 and the valve 21 are further rotated counterclockwise through 90 degrees, the rotation angle of the valve 21 is 180 degrees, and the valve is "closed". In this situation, the protrusion 460 is in contact with the upper surface of the stopper 461, so as to prevent further counterclockwise rotation of the first gear 42.

Figure 32:
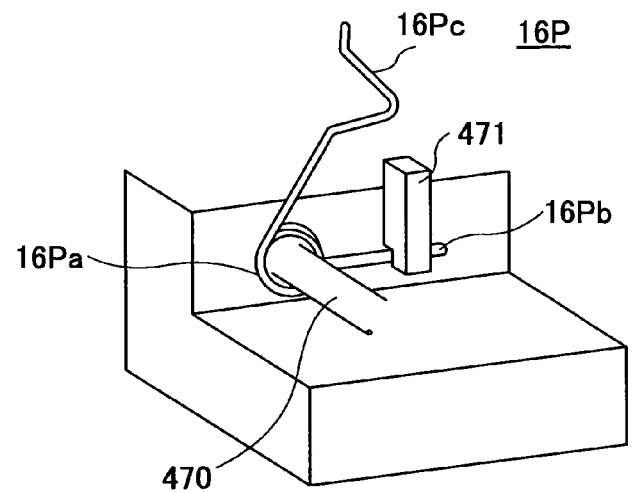
FIG. 32 illustrates another example of a power supply terminal.

FIG. 32 illustrates another example of the power supply terminals. A power supply terminal 16P is a spring-like wire having a coil portion 16Pa, an arm portion 16Pb, and a power supply terminal portion 16Pc. The coil portion 16Pa is supported by a pin 470, and the arm portion 16Pb is engaged with an engaging portion 471. The power supply terminal portion 16Pc extends upward from the coil portion 16Pa.

Figure 33:
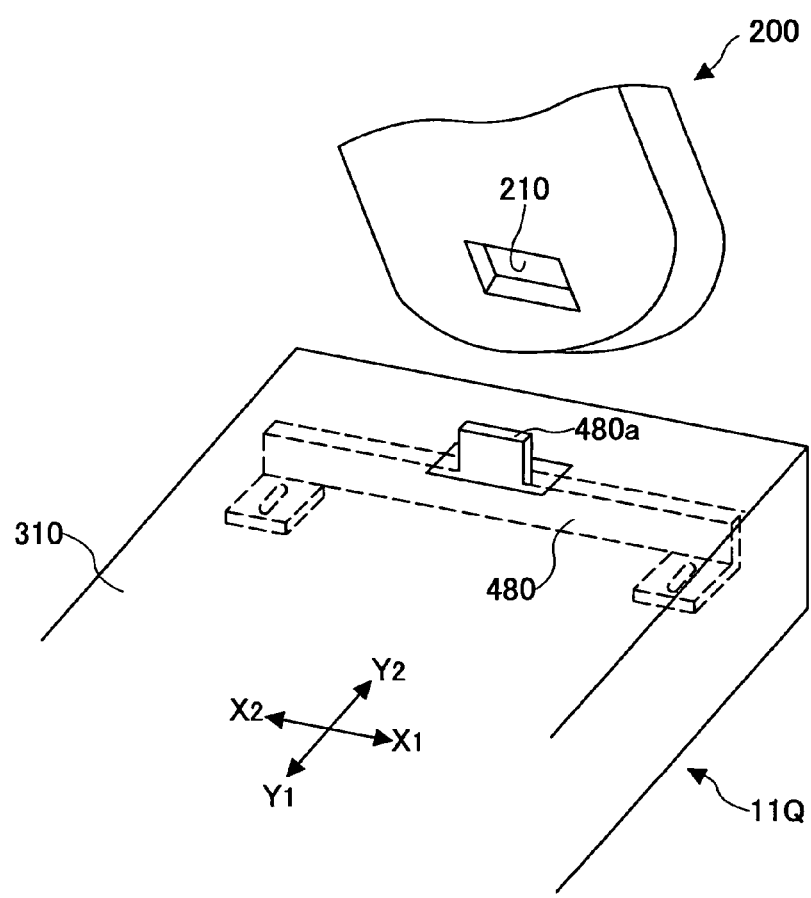
FIG. 33 illustrates another example of the portable telephone mounting portion.

FIG. 33 illustrates another example of the portable telephone mounting portion. A liquid fuel cell unit 11Q has an engaging member 480, with an engaging protrusion 480a protruding from the portable telephone mounting portion 31. A concave portion 210 formed on the lower surface of the portable telephone 200 is engaged with the engaging protrusion 480a, so that the portable telephone 200 is set onto the portable telephone mounting portion 31. Here, the movement of the opposite portions to the terminals 202 and 203 in the Y2, X1, and X2 directions (FIG. 27) are restricted.

Figure 34:
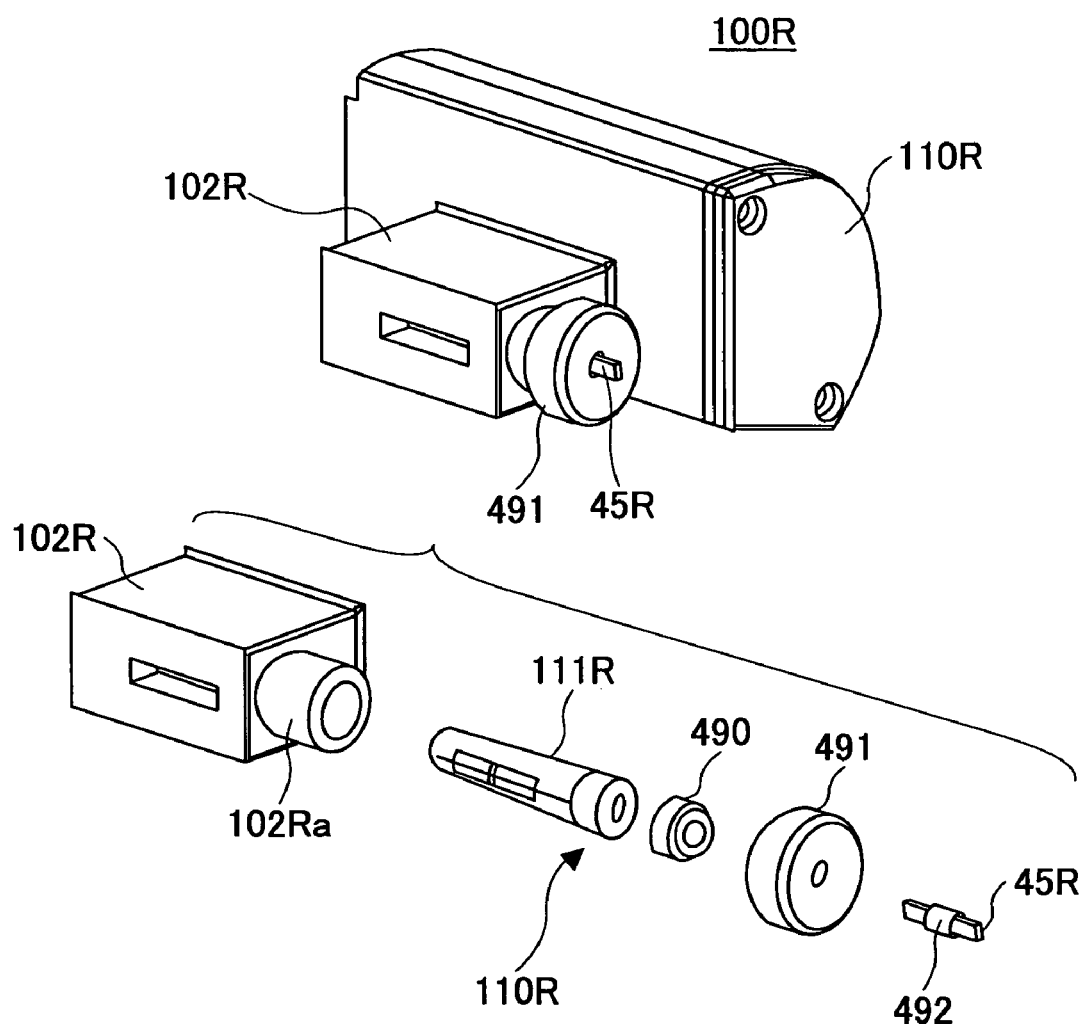
FIG. 34 illustrates a liquid fuel cartridge in accordance with still another embodiment of the present invention.

FIG. 34 illustrates a liquid fuel cartridge 100R in accordance with yet another embodiment of the present invention. The liquid fuel cartridge 100R has a valve unit 110R formed in the insertion potion 102R protruding from a liquid fuel tank unit 101R that has a section in the shape of a quarter circle. The valve unit 110R is characteristic of this embodiment. The valve unit 110R has a valve 111R inserted into a valve unit housing 102Ra that is part of the insertion portion 102R. The valve unit 110R is secured by a cap 491 via a packing 490, with a shaft member 492 being coupled to the end of the valve 111R (shown as 111Ra1 and 111Ra2). A rectangular shaft 45R formed at the other end of the shaft member 492 protrudes from the cap 491.

Figure 35A:
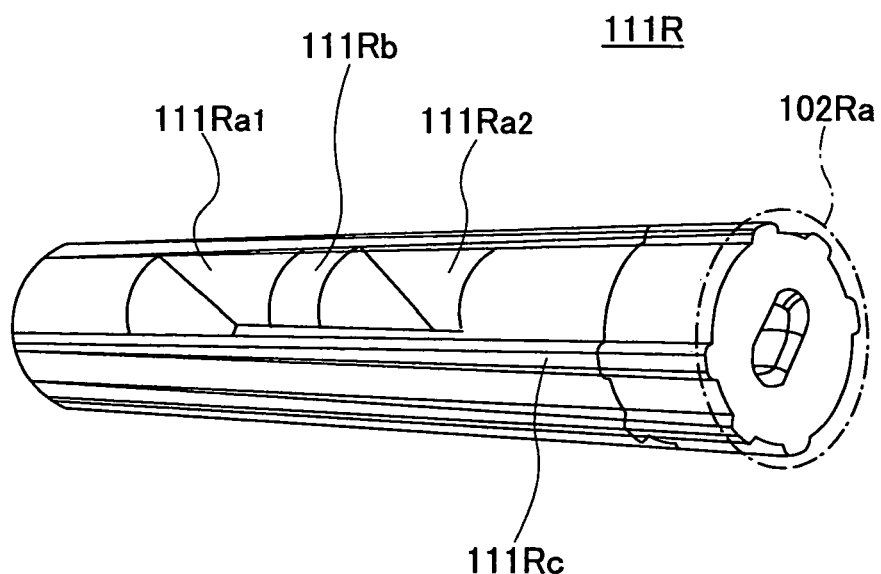
FIGS. 35A and 35B illustrate the valve of the structure shown in FIG. 34.
Figure 35B:
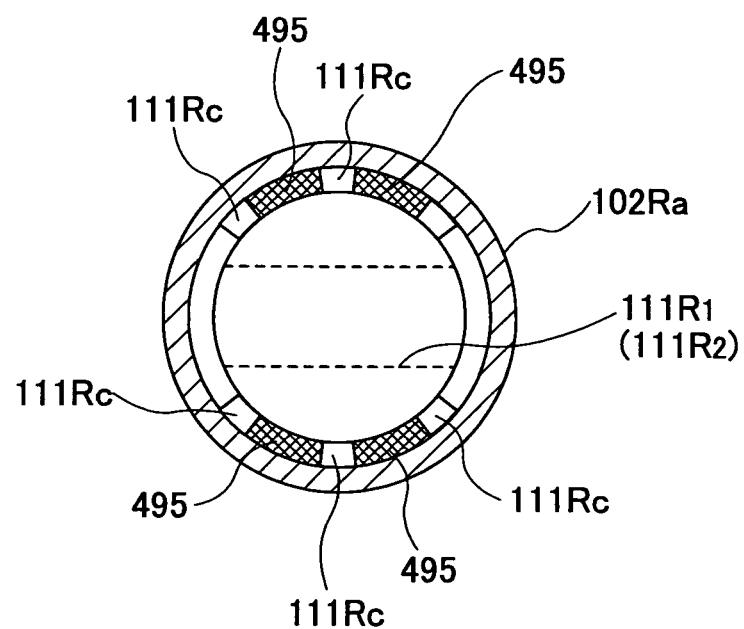

As shown in FIG. 35A, the valve 111R is a rod-like structure that is slightly tapered off. The valve 111R has a penetrating slit 111Ra and rib portions 111Rc that are formed on the circumferential surface of the valve 111R. The slit 111Ra is divided into two by a reinforcing partition portion 111Rb. The rib portions 111Rc are made of a rubber material, and are arranged at intervals in the circumferential direction. Each of the rib portions 111Rc extends in the longitudinal direction of the valve 111R. The gap between each two neighboring rib portions 111Rc that are located between the outer peripheral surface of the valve 111R and the inner peripheral surface of the valve unit housing 102Ra is filled with grease 495, thereby sealing the valve unit 110R and the valve unit housing 102Ra together.

The structure of the valve unit 110R can be applied to the valve unit 20 provided in the insertion receiving portion 19 of the liquid fuel cell unit 11 shown in FIGS. 5 and 6.

It should be noted that the present invention is not limited to the embodiments specifically disclosed above, but other variations and modifications may be made without departing from the scope of the present invention.

This patent application is based on Japanese Priority Patent Application No. 2004-026463, filed on Feb. 3, 2004, the entire contents of which are hereby incorporated by reference.

What is claimed is:

1. A liquid fuel cell system, comprising:
a liquid fuel cell unit having an insertion receiving portion;
a liquid fuel cartridge that is filled with liquid fuel and has an insertion portion connectable to the insertion receiving portion of the liquid fuel cell unit, the insertion portion and the insertion receiving portion being connected together to form a fuel conduit to supply the liquid fuel from the liquid fuel cartridge to the liquid fuel cell unit; and
valve units, manually operable, one of the valve units being located in the insertion portion of the liquid fuel cartridge and another of the valve units being located in the insertion receiving portion of the liquid fuel cell unit,
the liquid fuel remaining unused in the liquid fuel cell unit being returned to the liquid fuel cartridge through said fuel conduit,
wherein the valve units are opened through a manual operation when the liquid fuel is supplied through the fuel conduit from the liquid fuel cartridge to the liquid fuel cell unit and when the liquid fuel remaining unused in the liquid fuel cell unit is returned through the fuel conduit to the liquid fuel cartridge, and, the valve units are placed in a closed state, through a manual operation, when the liquid fuel cell unit generates power and the liquid fuel cell unit has a plurality of cells and gas permeable films, wherein cells and gas permeable films are alternately arranged on the upper surface and the lower surface of the liquid fuel cell unit that is a flat, hollow rectangular parallelepiped, the cells being supplied with the liquid fuel to generate power, and the gas permeable films discharging generated gas.

2. The liquid fuel cell system as claimed in claim 1, wherein the valve units are located in an insertion portion of the liquid fuel cartridge and an insertion receiving portion of the liquid fuel cell unit, and
the fuel cell system further comprises
an operations member that is operated when the liquid fuel is supplied from the liquid fuel cartridge into the liquid fuel cell unit and when the liquid fuel, remaining unused in the liquid fuel cell unit, is returned to the liquid fuel cartridge; and
an interlock mechanism that interlocks the valve units together when the operations member is operated.

3. The liquid fuel cell system as claimed in claim 2, further comprising:
an operations member lock mechanism that prevents operation of the operations member when the liquid fuel cartridge is not attached to the liquid fuel cell unit.

4. The liquid fuel cell system as claimed in claim 2, further comprising:
a liquid fuel cartridge lock mechanism that locks the liquid fuel cartridge so that the liquid fuel cartridge cannot be detached from the liquid fuel cell unit, when the liquid fuel cartridge is attached to the liquid fuel cell unit and the operations member is operated to open the valve units.

5. The liquid fuel cell system as claimed in claim 1, further comprising:
an operations member that is operated when the liquid fuel is supplied from the liquid fuel cartridge to the liquid fuel cell unit and when the liquid fuel, remaining unused in the liquid fuel cell unit, is returned to the liquid fuel cartridge.

6. The liquid fuel cell system as claimed in claim 5, further comprising:
an operations member lock mechanism that prevents operation of the operations member, when the liquid fuel cartridge is not attached to the liquid fuel cell unit.

7. The liquid fuel cell system as claimed in claim 5, further comprising:
a liquid fuel cartridge lock mechanism that locks the liquid fuel cartridge so that the liquid fuel cartridge cannot be detached from the liquid fuel cell unit, when the liquid fuel cartridge is attached to the liquid fuel cell unit and the operations member is operated to open any of the valve units.

8. A liquid fuel cell system, comprising:
a liquid fuel cell unit having an insertion receiving portion;
a liquid fuel cartridge that is filled with liquid fuel and has an insertion portion connectable to the insertion receiving portion of the liquid fuel cell unit, the insertion portion and the insertion receiving portion being connected together to form a fuel conduit to supply the liquid fuel from the liquid fuel cartridge to the liquid fuel cell unit; and
valve units, manually operable and normally in a closed state, one of the valve units being located in the insertion portion of the liquid fuel cartridge and another of the valve units being located in the insertion receiving portion of the liquid fuel cell unit,
the liquid fuel remaining unused in the liquid fuel cell unit being returned to the liquid fuel cartridge through said fuel conduit,
wherein the valve units are opened through a manual operation when the liquid fuel is supplied through the fuel conduit from the liquid fuel cartridge to the liquid fuel cell unit and when the liquid fuel remaining unused in the liquid fuel cell unit is returned through the fuel conduit to the liquid fuel cartridge, and the liquid fuel cell unit has a plurality of cells and gas permeable films, which cells and gas permeable films are alternately arranged on the upper surface and the lower surface of the liquid fuel cell unit that is a flat, hollow rectangular parallelepiped, the cells being supplied with the liquid fuel to generate power, and the gas permeable films discharging generated gas.

9. The liquid fuel cell system as claimed in claim 1, wherein the liquid fuel cell unit has a transparent window through which an amount of the liquid fuel inside can be observed.

10. The liquid fuel cell system as claimed in claim 1, wherein the liquid fuel cell unit has a power supply terminal cover that protects power supply terminals to which voltages are applied.

11. The liquid fuel cell system as claimed in claim 1,
wherein each of the valve units has a valve that is a rod-like structure and has rib portions formed at intervals in the circumferential direction on the circumferential surface thereof, the valve being housed in a valve unit housing, each gap formed by the rib portions between the valve and the valve unit housing being filled with grease.

* * * * *